(12) United States Patent
Noma et al.

(10) Patent No.: US 10,540,337 B2
(45) Date of Patent: Jan. 21, 2020

(54) COMPUTER-READABLE RECORDING MEDIUM, DATA PLACEMENT METHOD, AND DATA PLACEMENT DEVICE

(71) Applicant: FUJITSU LIMITED, Kawasaki-shi, Kanagawa (JP)

(72) Inventors: Yui Noma, Kawasaki (JP); Makiko Konoshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 964 days.

(21) Appl. No.: 14/793,196

(22) Filed: Jul. 7, 2015

(65) Prior Publication Data

US 2016/0063042 A1 Mar. 3, 2016

(30) Foreign Application Priority Data

Aug. 26, 2014 (JP) .................................. 2014-171372

(51) Int. Cl.
| G06F 17/00 | (2019.01) |
| G06F 17/30 | (2006.01) |
| G06F 16/22 | (2019.01) |
| G06F 16/245 | (2019.01) |
| G06F 16/28 | (2019.01) |

(52) U.S. Cl.
CPC ........ G06F 16/2228 (2019.01); G06F 16/245 (2019.01); G06F 16/285 (2019.01)

(58) Field of Classification Search
CPC ......... G06F 17/30321; G06F 17/30339; G06F 17/30424; G06F 17/30598; G06F 16/2453; G06F 16/2228; G06F 6/278
See application file for complete search history.

(56) References Cited

U.S. PATENT DOCUMENTS

| 6,076,074 A | 6/2000 | Cotton et al. |
| 7,558,802 B2 | 7/2009 | Yako et al. |

(Continued)

FOREIGN PATENT DOCUMENTS

| EP | 1302873 A2 | 4/2003 |
| JP | 2002-513975 | 5/2002 |

(Continued)

OTHER PUBLICATIONS

Extended European Search Report dated Jan. 4, 2016 for corresponding European Patent Application No. 15176802.5, 9 pages.

(Continued)

*Primary Examiner* — Tony Mahmoudi
*Assistant Examiner* — Thai V Dang
(74) *Attorney, Agent, or Firm* — Fujitsu Patent Center

(57) ABSTRACT

A data placement device creates a similarity index for each of computational resources based on a similarity between each of the pieces of acquired data and each of the pieces of data stored in the computational resources. The data placement device allocates on the basis of the similarity index of each of the computational resources with respect to the pieces of the data, the pieces of the data to each of the computational resources by using a matching system in which the similarity index associated with each allocation becomes stable in a direction in which the similarity index is small. The placement device places the pieces of the acquired data into the computational resources on the basis of the allocation result.

9 Claims, 24 Drawing Sheets

(56) References Cited

U.S. PATENT DOCUMENTS

| | | | |
|---|---|---|---|
| 7,908,374 B2 | 3/2011 | Takase et al. | |
| 2011/0225165 A1* | 9/2011 | Burstein | G06F 16/2272 707/741 |
| 2011/0246741 A1* | 10/2011 | Raymond | G06F 16/1752 711/170 |
| 2012/0303628 A1* | 11/2012 | Silvola | G06F 16/2282 707/741 |
| 2014/0108587 A1* | 4/2014 | Goldberg | G06F 15/167 709/215 |
| 2015/0019816 A1* | 1/2015 | Akirav | G06F 3/0641 711/129 |

FOREIGN PATENT DOCUMENTS

| | | |
|---|---|---|
| JP | 2003-223344 | 8/2003 |
| JP | 2007-122302 | 5/2007 |
| JP | 2008-021295 | 1/2008 |
| WO | 99/57665 | 11/1999 |
| WO | 2013136528 | 9/2013 |

OTHER PUBLICATIONS

Dewitt, David et al, "Parallel Database Systems: The Future of High Performance Database Systems", Communications of the ACM, Association for Computing Machinery, Inc, United States, vol. 35, No. 6, Jun. 1, 1992, pp. 85-98, XP000331759.

* cited by examiner

FIG.5

| -1 | -2 | -1 | -1 |
|----|----|----|----|
| -2 | -1 | -2 | 0  |
| -1 | -2 | -1 | -3 |
| -3 | -2 | -1 | -1 |

| -1 | -2 | -1 | -1 |
|----|----|----|----|
| -2 | -1 | -2 | 0  |
| -1 | -2 | -1 | -3 |
| -3 | -2 | -1 | -1 |

50a

| 2 | 1 | 3 | 4 |
|---|---|---|---|
| 1 | 3 | 2 | 4 |
| 4 | 2 | 1 | 3 |
| 1 | 2 | 3 | 4 |

51

50b

| 4 | 1 | 2 | 3 |
|---|---|---|---|
| 2 | 3 | 1 | 1 |
| 1 | 4 | 3 | 4 |
| 3 | 2 | 4 | 2 |

52

FIG.11
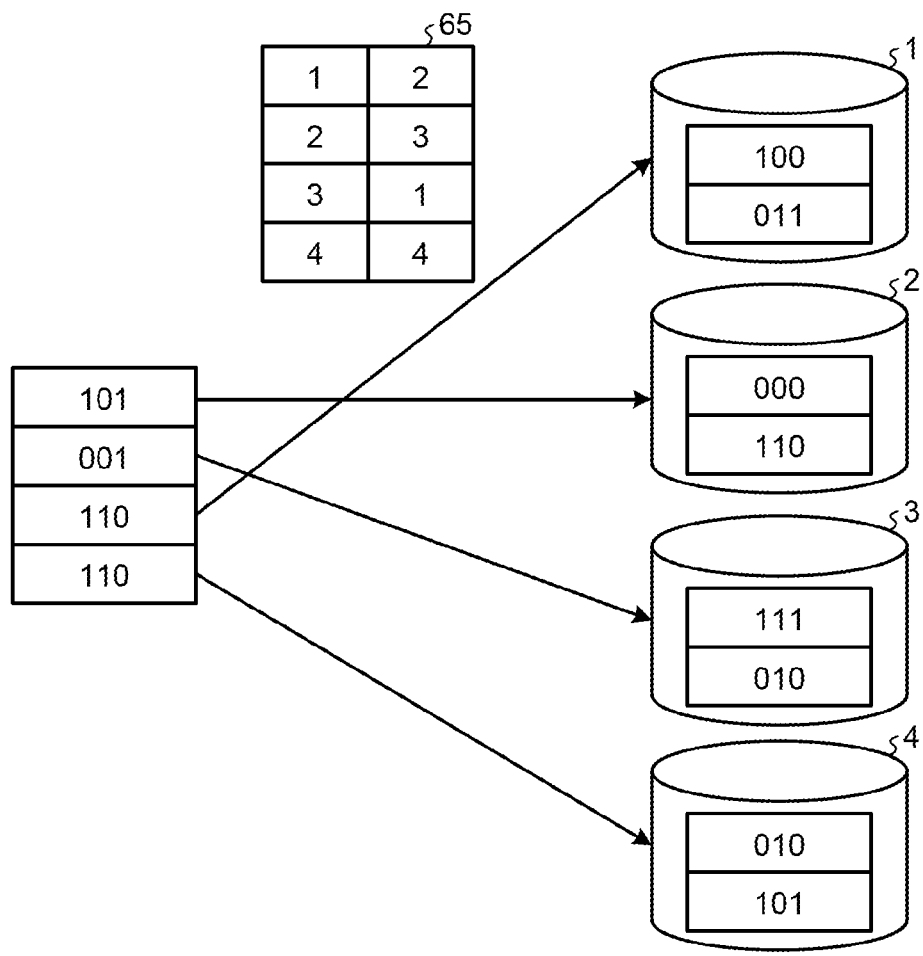
FIG.12
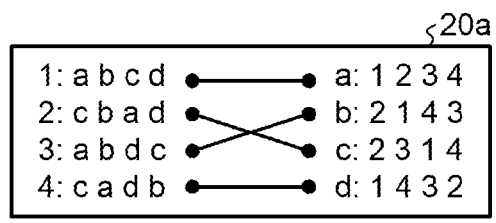
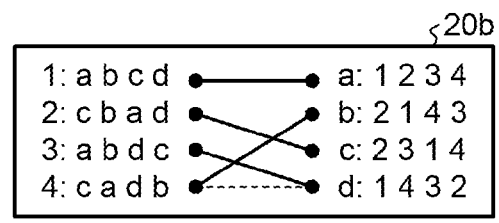

FIG.15

| DATA IDENTIFIER | DATA |
|---|---|
| 001 | (2.0, 4.1, 6.4) |
| 002 | (24.2, 14.3, 96, 6) |
| 003 | (20.8, 6.6, 7.9) |
| 004 | (120.8, 16.6, 17.9) |
| ... | ... |

| DATA IDENTIFIER | PLACEMENT DESTINATION |
|---|---|
| 001 | COMPUTATIONAL RESOURCE 1 |
| 002 | COMPUTATIONAL RESOURCE 3 |
| 003 | COMPUTATIONAL RESOURCE 1 |
| 004 | UNDEFINED |
| ... | ... |

115

COMPUTER-READABLE RECORDING MEDIUM, DATA PLACEMENT METHOD, AND DATA PLACEMENT DEVICE

CROSS-REFERENCE TO RELATED APPLICATION(S)

This application is based upon and claims the benefit of priority of the prior Japanese Patent Application No. 2014-171372, filed on Aug. 26, 2014, the entire contents of which are incorporated herein by reference.

FIELD

The embodiment discussed herein is directed to a data placement method or the like.

BACKGROUND

It sometimes takes a long time to perform a checking process or calculate similarity by using unstructured data, such as an image, audio, sensor data, or the like. Accordingly, there is a conventional technology that improves the efficiency of the checking process by allocating record data to a plurality of computational resources and distributing the process.

FIG. 31 is a schematic diagram illustrating an example of a conventional technology. For example, when record data is checked by using a certain query, there may be a case in which the processing time does not depend on the query but only depends on the record data. For example, when the length of a certain frequency component present in a music file is counted in units of seconds, the processing time depends on the length of the music. In such a case, after solving the mixed integer programming problem, the pieces of the record data are distributed each of the computational resources such that the amount of the processes is almost equal.

In the example illustrated in FIG. 31, it is assumed that record data $10a$ to $10j$ are present and assumed that the length of each record data is defined to be the processing time that is needed to process the record data. For example, the record data $10a$, $10b$, and $10j$ are distributed to a first server, the record data $10c$, $10e$, $10d$, and $10g$ are distributed to a second server, and the record data $10i$, $10f$, and $10h$ are distributed to a third server. In this way, by distributing the record data $10a$ to $10j$, each of the processing time can be equalized.

Patent Document 1: Japanese Laid-open Patent Publication No. 2003-223344
Patent Document 2: Japanese National Publication of International Patent Application No. 2002-513975
Patent Document 3: Japanese Laid-open Patent Publication No. 2008-21295
Patent Document 4: International Publication Pamphlet No. WO 2013/136528

However, in the conventional technology described above, there is a problem in that, when the data is placed in a plurality of the computational resources, it is not possible to prevent an increase in similarities of data placed in the same computational resource while substantially equalizing the data allocated to each of the computational resources.

For example, there may be a case in which a processing time does not depend on only record data and thus varies depending on a pair of data, i.e., query data and record data. Furthermore, a processing time may sometimes be long as the pair of data is similar. In such a case, it is difficult for the conventional technology to efficiently perform the process even if each of the pieces of record data is distributed to each of the computational resources.

SUMMARY

According to an aspect of an embodiment, a computer-readable recording medium has stored therein a data placement program that causes a computer to execute a process including acquiring a plurality of pieces of data by a number that is associated with a number of the plurality of the computational resources from input data when pieces of data are placed in the plurality of computational resources in a distributed manner; creating the similarity index for each of the computational resources based on a similarity between each of the pieces of the acquired data and each of the pieces of data stored in the computational resources; allocating, on the basis of the similarity index of each of the computational resources with respect to the pieces of the data, the pieces of the data to each of the computational resources by using a matching system in which the similarity index associated with each allocation becomes stable in a direction in which the similarity index is small; and placing the pieces of the acquired data into the computational resources on the basis of the allocation result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram (5) illustrating a process performed by the data placement device according to the embodiment;
FIG. 6 is a diagram (6) illustrating a process performed by the data placement device according to the embodiment;
FIG. 11 is a diagram (11) illustrating a process performed by the data placement device according to the embodiment;
FIG. 12 is a schematic diagram illustrating a stable matching and an unstable matching;
FIG. 15 is a schematic diagram illustrating an example of the data structure of record data;

FIG. 16 is a schematic diagram illustrating an example of the data structure of placement destination information;

DESCRIPTION OF EMBODIMENT referred embodiments of the present invention will be explained with reference to accompanying drawings. The present invention is not limited to the embodiment.

An example of a process performed by a data placement device according to an embodiment will be described. FIGS. 1 to 11 are schematic diagrams each illustrating a process performed by the data placement device according to the embodiment. The data placement device performs stable matching on a plurality of pieces of data and a plurality of computational resources on the basis of the similarity index between the pieces of data and the data stored in each of the computational resources such that similar pieces of data are not allocated to the same computational resource.

Figure 1:
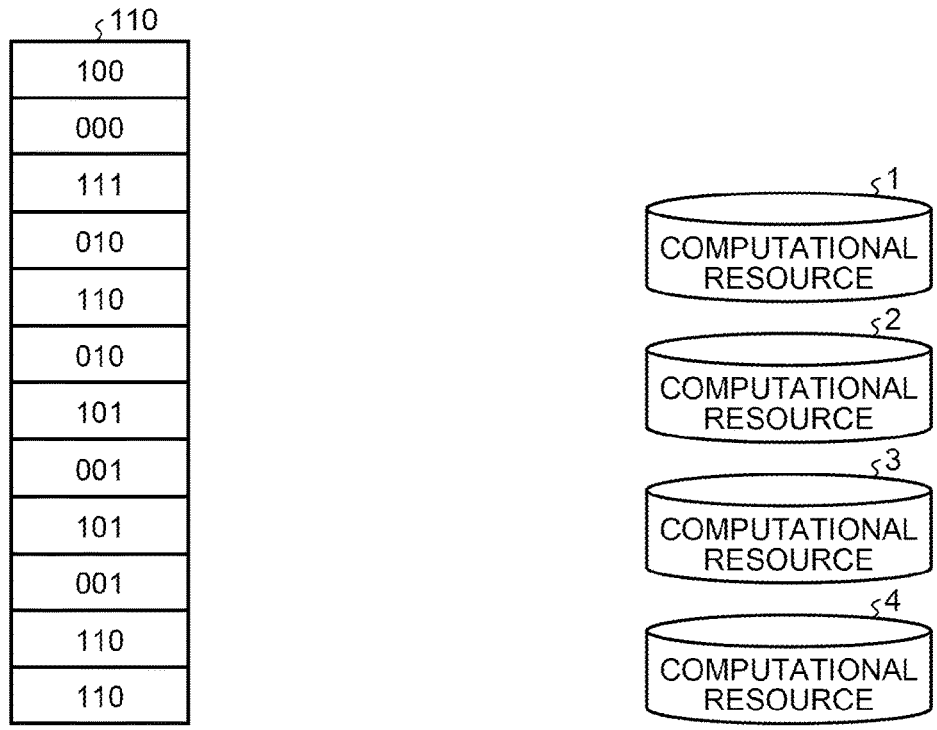
FIG. 1 is a diagram (1) illustrating a process performed by a data placement device according to an embodiment.

FIG. 1 will be described. FIG. 1 indicates an operation performed when pieces of data included in record data 110 are added to computational resources 1 to 4. As an example, it is assumed that the pieces of data to be added are bit strings. It is assumed that the similarity between the pieces of data is obtained by multiplying the negative by the Hamming distance between the bit strings. The Hamming distance indicates different bits in bit strings. For example, the similarity between a bit string "101" and a bit string "111" is −1.

Figure 2:
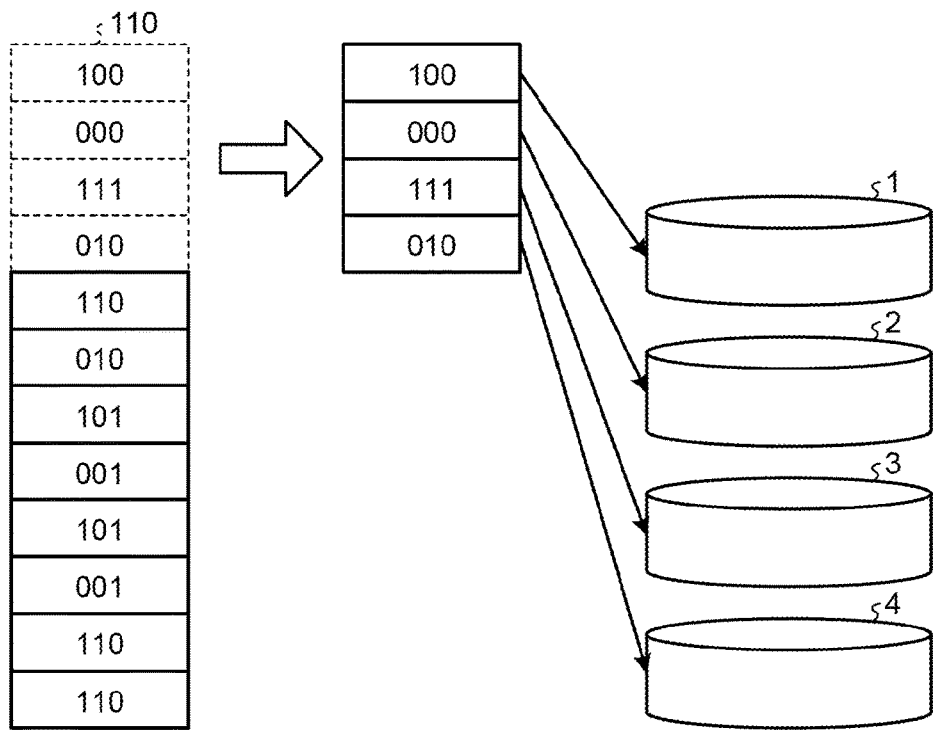
FIG. 2 is a diagram (2) illustrating a process performed by the data placement device according to the embodiment.

FIG. 2 will be described. The data placement device extracts data "100, 000, 111, and 010" from the record data 110. Because there is no data placed in the computational resources 1 to 4, the data placement device adds the data to the computational resources 1 to 4 without processing anything. Namely, the data placement device adds the data "100" to the computational resource 1. The data placement device adds the data "000" to the computational resource 2. The data placement device adds the data "111" to the computational resource 3. The data placement device adds the data "010" to the computational resource 4.

Figure 3:
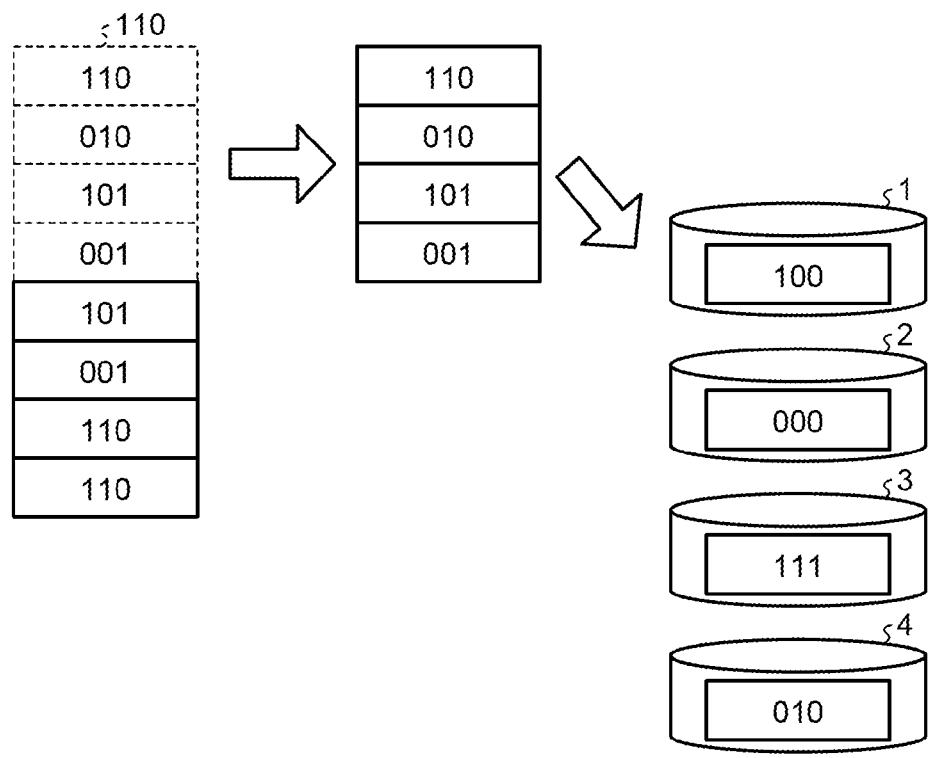
FIG. 3 is a diagram (3) illustrating a process performed by the data placement device according to the embodiment.

FIG. 3 will be described. The data placement device extracts data "110, 010, 101, 001" from the record data 110. The data placement device decides which computational resource is used to allocate the data "110, 010, 101, 001" by performing the following process.

Figure 4:
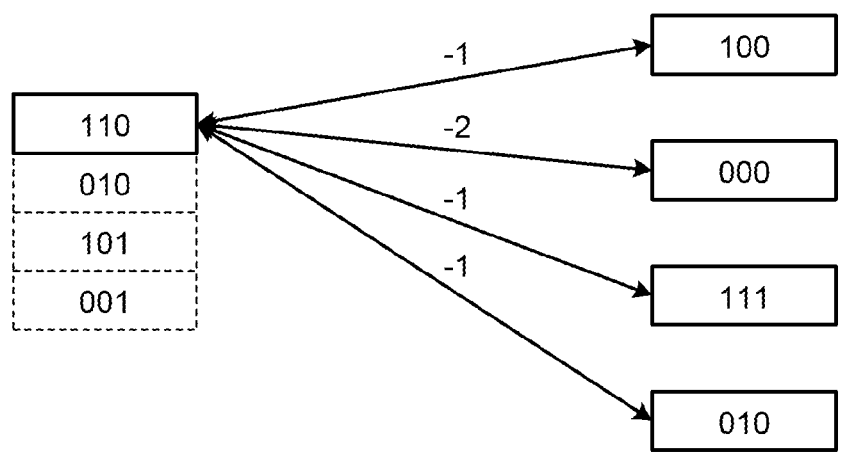
FIG. 4 is a diagram (4) illustrating a process performed by the data placement device according to the embodiment.

FIG. 4 will be described. The data placement device calculates the similarity between each of the pieces of the data "110, 010, 101, 001" extracted in FIG. 3 and the set of data present in each of the computational resources 1 to 4. When the data placement device calculates each of the similarities between the data "110" and each of the pieces of the data "100, 000, 111, and 010", the similarities become "−1, −2, −1, and −1", respectively. When the data placement device calculates each of the similarities between the data "010" and each of the pieces of the data "100, 000, 111, and 010", the similarities become "−2, −1, −2, and 0", respectively.

When the data placement device calculates each of the similarities between the data "101" and each of the pieces of the data "100, 000, 111, and 010", the similarities become "−1, −2, −1, and −3", respectively. When the data placement device calculates each of the similarities between the data "001" and each of the pieces of the data "100, 000, 111, and 010", the similarities become "−3, −2, −1, and −1", respectively.

In a description below, from among the pieces of data extracted by the data placement device from the record data 110, the first data is appropriately referred to as the first candidate data, the second data is appropriately referred to as the second candidate data, the third data is appropriately referred to as the third candidate data, and the fourth data is appropriately referred to as the fourth candidate data. In the example illustrated in FIG. 4, "110" corresponds to the first candidate data, "010" corresponds to the second candidate data, "101" corresponds to the third candidate data, and "001" corresponds to the fourth candidate data.

FIG. 5 will be described. The data placement device obtains a matrix 50 by calculating the similarities described with reference to FIG. 4. The first row of the matrix 50 indicates the similarities between the first candidate data and each of the pieces of the data "100, 000, 111, and 010" that are stored in the computational resources 1 to 4, respectively. The second row of the matrix 50 indicates the similarities between the second candidate data and each of the pieces of the data "100, 000, 111, and 010" that are stored in the computational resources 1 to 4, respectively. The third row of the matrix 50 indicates the similarities between the third candidate data and each of the pieces of the data "100, 000, 111, and 010" that are stored in the computational resources 1 to 4, respectively. The fourth row of the matrix 50 indicates the similarities between the fourth candidate data and each of the pieces of the data "100, 000, 111, and 010" that are stored in the computational resources 1 to 4, respectively.

FIG. 6 will be described. By separately sorting rows and columns of the matrix 50 and ranking the rows and columns, the data placement device creates a wish list 50a of the first to the fourth candidate data and creates a wish list 50b of the computational resources 1 to 4.

By ranking for each row of the matrix 50, the data placement device creates wish lists of the first to the fourth candidate data. The data placement device creates wish lists of the first to the fourth candidate data such that a high priority is given to the computational resource that does not includes therein similar pieces of data.

In the following, as an example, a description will be given of a case in which a wish list 51 of the third candidate data is created on the basis of the third row of the matrix 50. The third row of the matrix 50 becomes "−1, −2, −1, and −3". Consequently, for the third candidate data and each of the pieces of data stored in the computational resources, when arranging the pieces of the data in the order the similarity is low, the result is in the order of the computational resource 4, the computational resource 2, the computational resource 1, and the computational resource 3. However, because the similarities of the computational resource 1 and the computational resource 3 are the same, the order of the computational resource 1 and the computational resource 3 may be inverted. The data placement device sets the wish list of the third candidate data to "4, 2, 1, and 3". The data placement device creates the wish list 50a by also performing the same process on the first, the second, and the fourth candidate data.

By ranking for each column of the matrix 50, the data placement device creates a wish list of each of the computational resources 1 to 4. The data placement device creates the wish list of each of the computational resources 1 to 4 such that a priority is given to the candidate data that have no similarity.

In the following, as an example, a description will be given of a case in which a wish list 52 of the computational resource 2 is created on the basis of the second column of the matrix 50. The second column of the matrix 50 becomes "−2, −1, −2, and −2". Consequently, for both the data stored in the computational resource 2 and the first to the fourth candidate data, when arranging the data in the order the similarity is low, the result is in the order of the first candidate data, the third candidate data, the fourth candidate data, and the second candidate data. However, because the similarities of the first candidate data, the third candidate data, and the fourth candidate data are the same, any order is possible as long as the first candidate data, the third candidate data, and the fourth candidate data are listed between the first and the third rank in the second column. The data placement device sets the wish list of the computational resource 2 to "1, 3, 4, and 2". The data placement device creates the wish list 50b by also performing the same process on the computational resources 1, 3, and 4.

Figure 7:
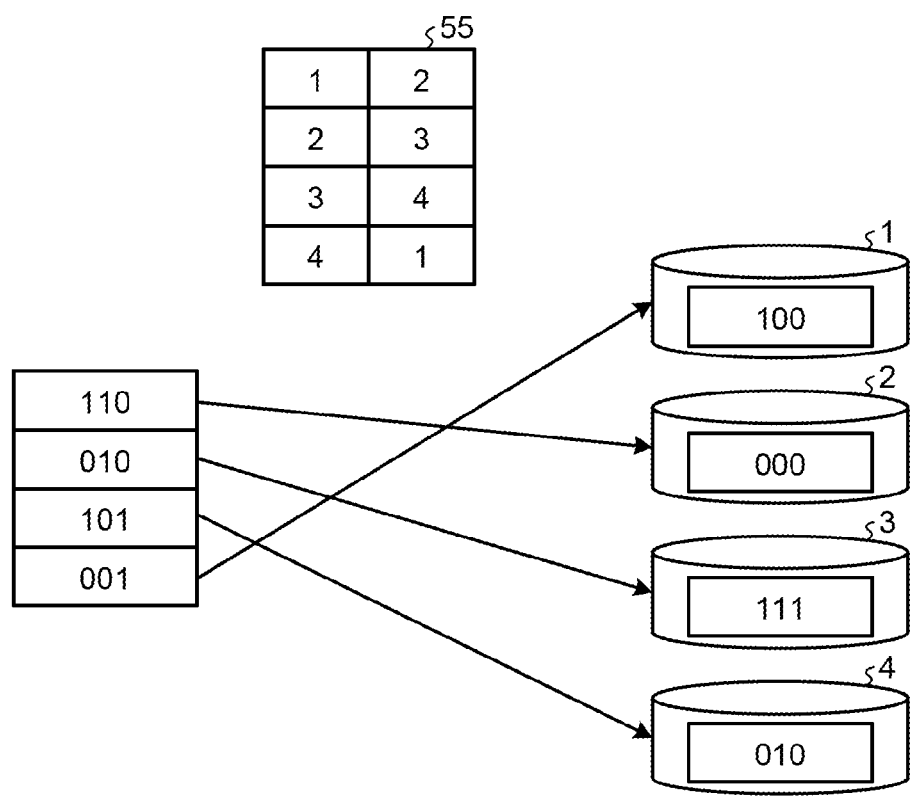
FIG. 7 is a diagram (7) illustrating a process performed by the data placement device according to the embodiment.

FIG. 7 will be described. The data placement device obtains a matching result 55 by inputting the wish list 50a and the wish list 50b illustrated in FIG. 6 into the stable matching function. The matching result 55 indicates that the first candidate data is to be added to the computational resource 2, the second candidate data is to be added to the computational resource 3, the third candidate data is to be added to the computational resource 4, and the fourth candidate data is to be added to the computational resource 1.

On the basis of the matching result 55, the data placement device adds the first candidate data to the computational resource 2, adds the second candidate data to the computational resource 3, adds the third candidate data to the computational resource 4, and adds the fourth candidate data to the computational resource 1.

Figure 8:
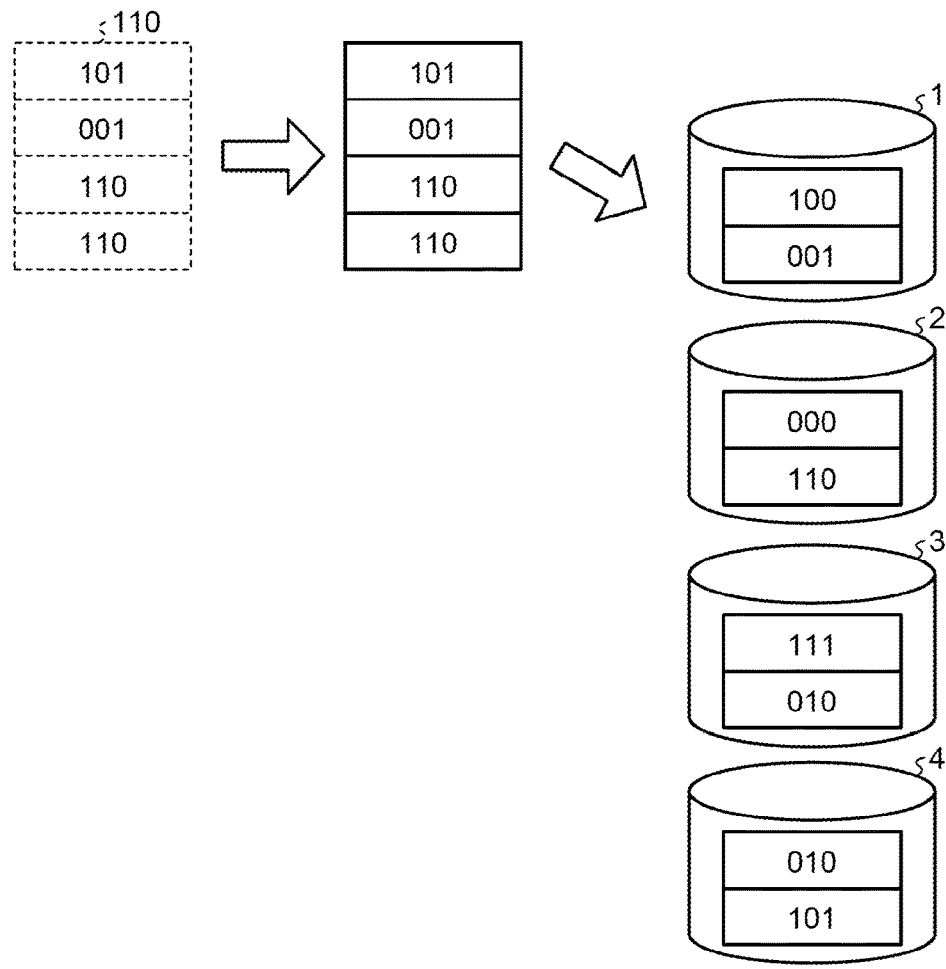
FIG. 8 is a diagram (8) illustrating a process performed by the data placement device according to the embodiment.

FIG. 8 will be described. The data placement device extracts the pieces of the data "101, 001, 110, and 110" from the record data 110. The data placement device decides the pieces of the data "101, 001, 110, and 110" are to be allocated which of the computational resources by performing the following process. In the example illustrated in FIG. 8, "101" becomes the first candidate data, "001" becomes the second candidate data, "110" becomes the third candidate data, and "110" becomes the fourth candidate data.

Figure 9:
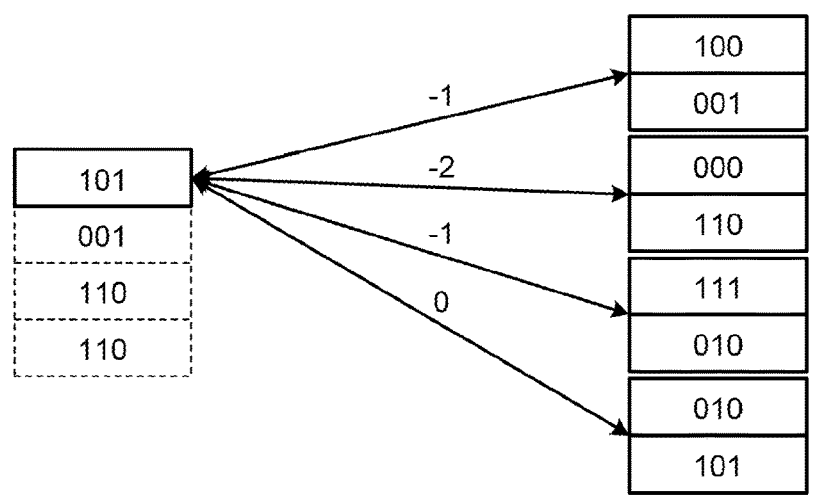
FIG. 9 is a diagram (9) illustrating a process performed by the data placement device according to the embodiment.

FIG. 9 will be described. The data placement device calculates the similarities between the extracted first to the fourth candidate data illustrated in FIG. 8 and the data sets in the computational resources 1 to 4, respectively. If a plurality of pieces of data is present in a computational resource, the data placement device obtains the maximum value from among the similarities between the candidate data and each of the pieces of the data. Namely, the similarity with the closest similar data is obtained.

For example, when data placement device calculates the similarities between the first candidate data and each of the computational resources 1 to 4, the calculated similarities are "−1, −2, −1, and 0", respectively. When data placement device calculates the similarities between the second candidate data and each of the computational resources 1 to 4, the calculated similarities are "−1, −1, −2, and −1", respectively. When data placement device calculates the similarities between the third candidate data and each of the computational resources 1 to 4, the calculated similarities are "−1, 0, −1, and −1", respectively. When data placement device calculates the similarities between the fourth candidate data and each of the computational resources 1 to 4, the calculated similarities are "−1, 0, −1, and −1", respectively.

Figure 10:
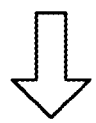
FIG. 10 is a diagram (10) illustrating a process performed by the data placement device according to the embodiment.

FIG. 10 will be described. The data placement device obtains a matrix 60 by calculating the similarities described with reference to FIG. 9. The first row of the matrix 60 indicates the similarities between the first candidate data and each of the computational resources 1 to 4. The second row of the matrix 60 indicates the similarities between the second candidate data and each of the computational resources 1 to 4. The third row of the matrix 60 indicates the similarities between the third candidate data and each of the computational resources 1 to 4. The fourth row of the matrix 60 indicates the similarities between the fourth candidate data and each of the computational resources 1 to 4.

By separately sorting and ranking the rows and the columns of the matrix 60, the data placement device creates a wish list 60a of the first to the fourth candidate data and a wish list 60b of the computational resources 1 to 4. The processes of creating the wish lists 60a and 60b are the same as the processes of creating the wish lists 50a and 50b illustrated in FIG. 6.

FIG. 11 will be described. The data placement device obtains a matching result 65 by inputting the wish list 60a and the wish list 60b illustrated in FIG. 10 to the stable matching function. The matching result 65 indicates that the first candidate data is to be added to the computational resource 2, the second candidate data is to be added to the computational resource 3, the third candidate data is to be added to the computational resource 1, and the fourth candidate data is to be added to the computational resource 4.

On the basis of the matching result 65, the data placement device adds the first candidate data to the computational resource 2, adds the second candidate data to the computational resource 3, adds the third candidate data to the computational resource 1, and adds the fourth candidate data to the computational resource 4. The data placement device repeats the processes described above until no data is present in the record data 110.

By performing the processes illustrated in FIGS. 1 to 11, when arraying the data in a plurality of the computational resources, the data placement device can prevent an increase in similarities of data placed in the same computational resource while substantially equalizing the data allocated to each of the computational resources.

In the following, a description will be given of an example of a stable matching problem, such as Stable marriage problem, used by the data placement device according to the embodiment. The stable matching problem is a problem of creating stable pairs of males and females if N males and N females are present, when each of the males has a wish list of females and each of the females has a wish list of males. When a matching of a male and a female is given, if both have another preferable partner ranking higher than the current paired partner, they elope. Such a pair is referred to as a blocking pair. The matching in which the blocking pair is present is referred to as an unstable matching, whereas the matching in which no blocking pair is present is referred to as a stable matching.

FIG. 12 is a schematic diagram illustrating a stable matching and an unstable matching. FIG. 12 illustrates a stable matching and an unstable matching when four males and four females are present. The four males are represented by 1, 2, 3, and 4 and the four females are represented by a, b, c, and d. Each of the males 1, 2, 3, and 4 has a wish list with respect to the females a, b, c, and d. For example, the order of wishes of the male 2 is c, b, a, and d. For example, the order of wishes of the female b is 2, 1, 4, and 3.

In a group 20a, each of the pairs are represented by (1 and a), (2 and c), (3 and b), and (4 and d). In the group 20a, because no blocking pair is present, it can be said that each of the pairs in the group 20a is the stable matching.

In contrast, in a group 20b, each of the pairs are represented by (1 and a), (2 and c), (3 and d), and (4 and b). In the group 20b, a blocking pair (4 and d) is present. This is because the male 4 prefers the female d to the female b, whereas the female d prefers the male 4 to the male 3. Consequently, it can be said that each of the pairs in the group 20b is an unstable matching.

Figure 13:
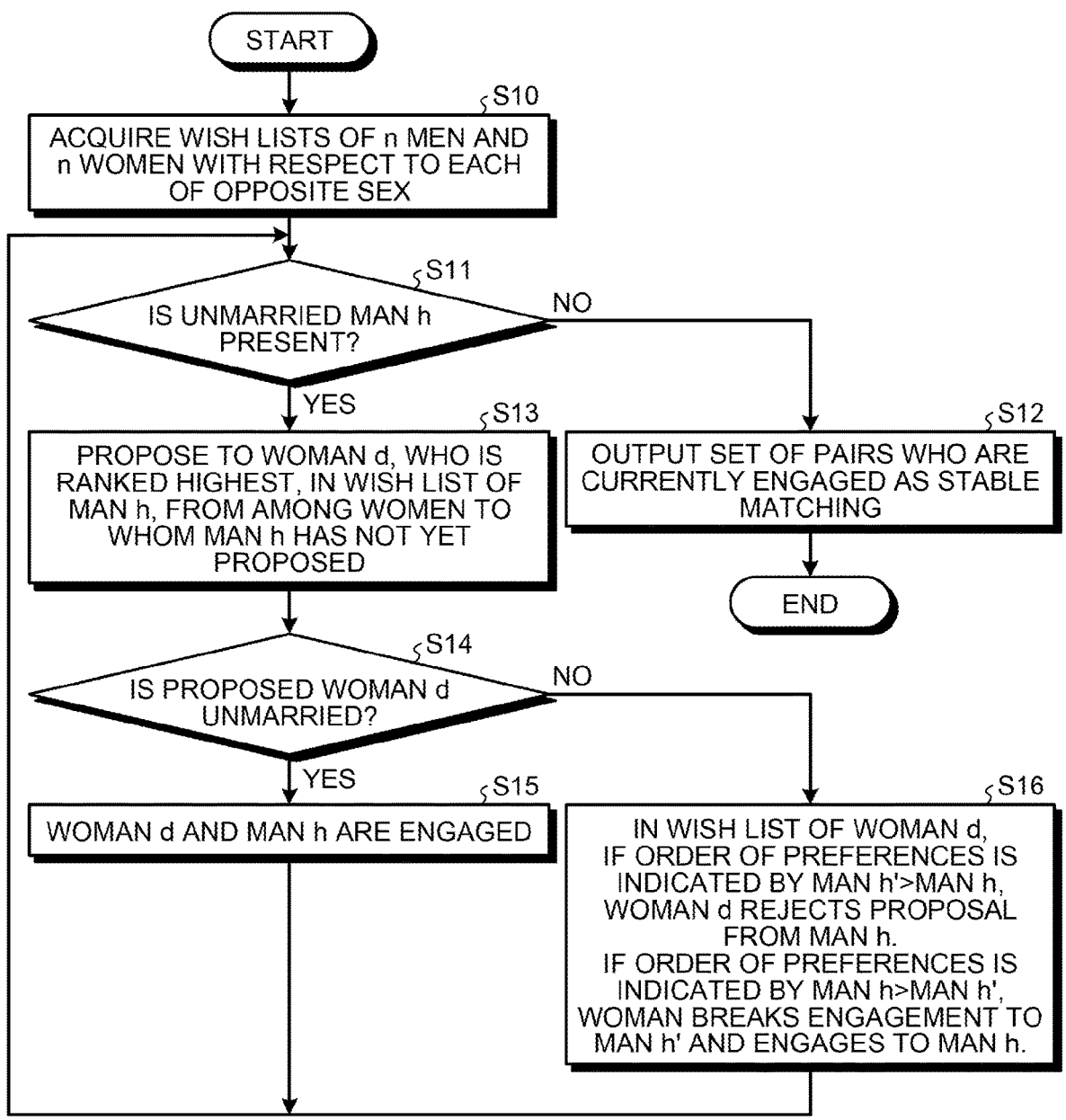
FIG. 13 is a schematic diagram illustrating an example of the flow of a process of the Gale-Shapley algorithm.

In the following, a description will be given of the Gale-Shapley (Gale-Shapley) algorithm that is used to obtain the stable matching indicated by the group 20a illustrated in FIG. 12. FIG. 13 is a schematic diagram illustrating an example of the flow of a process of the Gale-Shapley algorithm. By performing the process illustrated in FIG. 13, a stable matching can be obtained. In a description below, the Gale-Shapley algorithm is appropriately referred to as GS.

As illustrated in FIG. 13, the GS acquires wish lists of n men and n women with respect to each of the opposite sex (Step S10). The GS determines whether an unmarried man h is present (Step S11). If no unmarried man h is present (No at Step S11), the GS outputs the set of currently engaged pairs as a stable matching (Step S12).

In contrast, if an unmarried man h is present (Yes at Step S11), the GS allows the man h to propose to the woman d, who is ranked the highest from among the women, in the wish list, to whom the man h has not yet proposed (Step S13). The GS determines whether the proposed woman d is unmarried (Step S14).

If the woman d is unmarried (Yes at Step S14), the GS allows the woman d and the man h to be engaged (Step S15) and proceeds to Step S11. In contrast, if the woman d is not unmarried (No at Step S14), the GS proceeds to Step S16.

At Step S16, in the wish list of the woman d, if the order of the preferences is indicated by the man h'>the man h, the woman d rejects a proposal from the man h. If the order of the preferences is indicated by the man h>the man h', the woman breaks the engagement to the man h' and becomes engage to the man h. After the GS ends the process at Step S16, the GS proceeds to Step S11.

In the following, extended Gale-Shapley obtained by extending the Gale-Shapley algorithm will be described. In a description below, the extended Gale-Shapley is referred to as the extended GS. The extended GS deletes, from the wish list, a paired candidate who is not the stable matching in the course of the algorithm. Specifically, the extended GS differs from the GS in that, if the extended GS allows the man h to get engaged to the woman d, a man with the priority lower than that of the man h is deleted from the wish list of the woman d. By adding this process, the stable matching can be performed more efficiently when compared with a case in which the GS is performed.

In the following, extending of the stable matching problem will be described. A classical stable matching problem is performed on the basis of the assumptions of the following cases (1) to (3): a case (1) in which the number of males and females are the same, a case (2) in which the same order is not allowed in all of the wish lists, and a case (3) in which all of the males and the females rank all of the opposite sex. Namely, remaining single is not allowed. Accordingly, as indicated below, the problem can be generalized by loosening the assumptions of the cases (1) to (3).

A description will be given of a state in which the case (1) is not present, the case (2) is present, and the case (3) is present. In such a case, the stable matching problem is solved by using the extended GS. The number of persons corresponding to the number of difference between the males and the females are unmarried.

A description will be given of a state in which the case (1) is present, the case (2) is not present, and the case (3) is present. In such a case, the classical stable matching problem occurs by forcedly ranking the same ranks in the list. After ranking the persons with the same ranks, the problem is solved by using the extended GS.

A description will be given of a state in which the case (1) is present, the case (2) is present, and the case (3) is not present. In such a case, the stable matching problem with an incomplete list occurs. This unstable matching problem is solved by using the extended GS. At this time, some unmarried person is present.

A description will be given of a state in which the case (1) is present, the case (2) is not present, and the case (3) is not present. In such a case, after ranking the persons with the same ranks, the problem is solved by using the extended GS. The person who becomes unmarried varies depending on the way of ranking the wish list.

In the following, a hospitals/residents problem will be described. The hospitals/residents problem is a problem in which placement of residents with respect to hospitals is decided. This problem differs from the stable matching problem described above in that a hospital has the maximum number of people accepted and does not accept the number of people exceeding the maximum number. The maximum number of persons people accepted by a hospital is referred to as a quota. If the quota of all hospitals is 1, the hospitals/residents problem is the same problem as the stable matching problem.

To solve the hospitals/residents problem, in accordance with the following steps, the hospitals/residents problem is fixed to a stable matching problem with an incompletion list. If the quota of a hospital A is set to "qA", A is divided into qA pieces, thus obtaining A1, A2, A3, ..., and AqA for the quota of 1. Furthermore, for the hospital A that is included in a wish list of a resident, A1 out of qA pieces is changed to AqA and ranking is forcedly performed on the hospital A.

For example, it is assumed that the hospitals A and B are present, assumed that the quota of the hospital A is set to 2, and assumed that the quota of the hospital B is set to 1. It is assumed that, in a wish list of a certain resident, the first wish is the hospital B and the second is the hospital A. In such a case, first, the hospital A is divided into the hospital A1 and the hospital A2 and then, for the hospital A1 and the hospital A2, the ranking is forcedly performed. For example, a second wish or a third wish is randomly allocated to the hospitals A1 and A2. By doing so, for example, for the wish list of a certain resident, it is assumed that the first wish is set to the hospital B, the second wish is set to the hospital A1, and the third wish is set to the hospital A2. Consequently, because the problem becomes the stable matching problem with an incompletion list, the problem is solved by using the extended GS.

Figure 14:
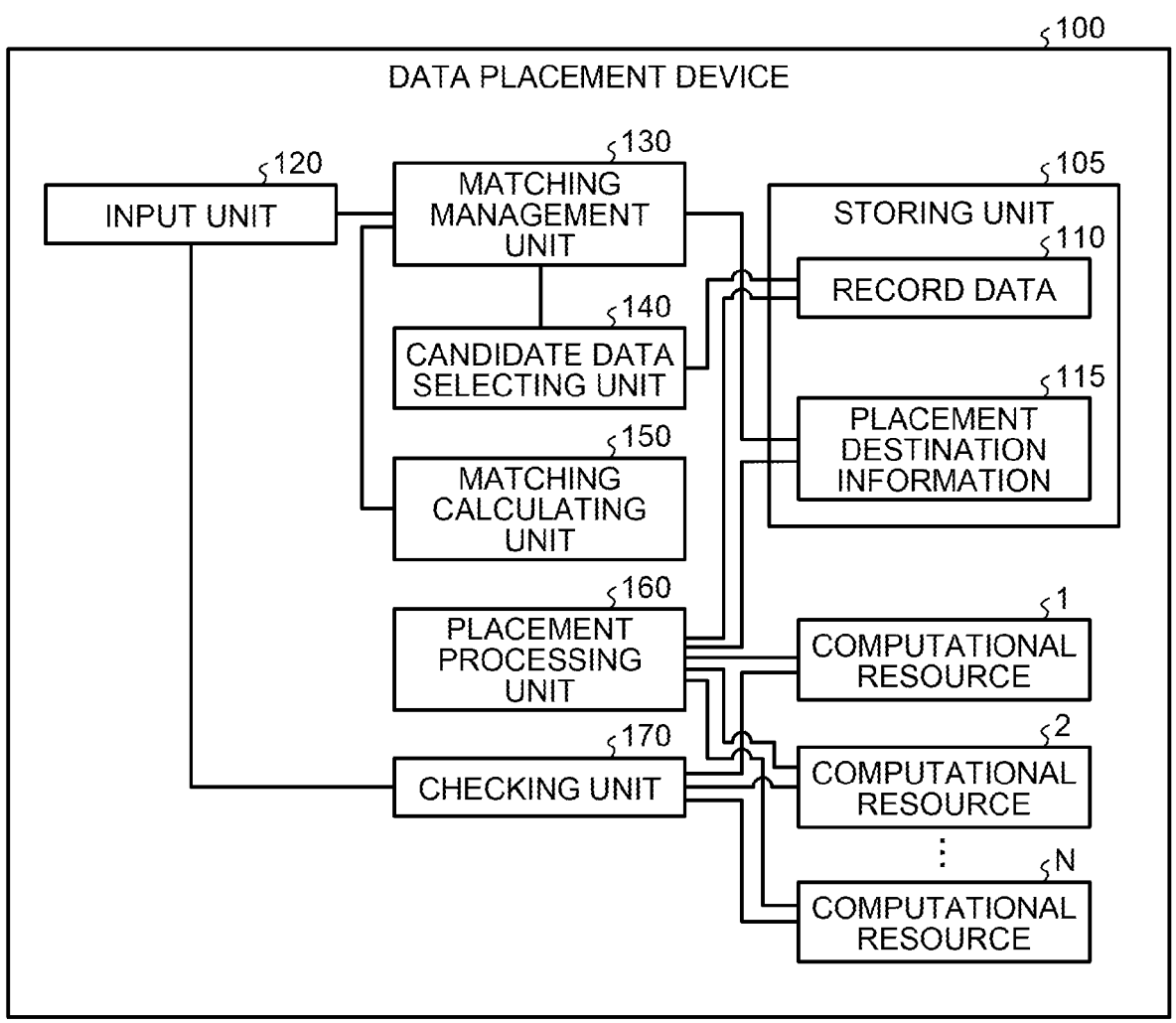
FIG. 14 is a functional block diagram illustrating the configuration of the data placement device according to the embodiment.

In the following, a description will be given of an example of the configuration of the data placement device according to the embodiment. FIG. 14 is a functional block diagram illustrating the configuration of the data placement device according to the embodiment. As illustrated in FIG. 14, a data placement device 100 includes N computational resources 1 to N. The symbol of N is a natural number equal to or greater than two. Furthermore, the data placement device 100 includes a storing unit 105, an input unit 120, a matching management unit 130, a candidate data selecting unit 140, a matching calculating unit 150, a placement processing unit 160, and a checking unit 170.

The storing unit 105 includes the record data 110 and placement destination information 115. The storing unit 105 is, for example, storage device, such as a semiconductor memory device including a random access memory (RAM), a read only memory (ROM), a flash memory, or the like.

The record data 110 includes data to be placed in the computational resources 1 to N. FIG. 15 is a schematic diagram illustrating an example of the data structure of record data. As illustrated in FIG. 15, the record data 110 associates the data identifier with pieces of data. The data identifier is information for uniquely identifying data. The pieces of the data are data that are placed in each of the computational resources 1 to N. For example, the pieces of the data associated with the data identifier "001" are "2.0, 4.1, and 6.4". Here, FIG. 15 illustrates an example in which the data identifier is associated with a set of pieces of data; however, a single data identifier may also be associated with a single piece of data.

The placement destination information 115 is information that indicates the placement destination of data. FIG. 16 is a schematic diagram illustrating an example of the data structure of placement destination information. As illustrated in FIG. 16, the placement destination information 115 associates the data identifier with the placement destination. The data identifier corresponds to the data identifier described with reference to FIG. 15. The placement destination is information for uniquely identifying a computational resource in which data is placed. For example, in FIG. 16, the placement destination of the data associated with the data identifier "001" is "computational resource 1".

A description will be given here by referring back to FIG. 14. The input unit 120 is an input device that is used to input various kinds of information to the matching management unit 130 and the checking unit 170. For example, the input unit 120 corresponds to a keyboard, a mouse, a touch panel, or the like. For example, a user operates the input unit 120 and inputs, to the matching management unit 130, a data placement decision request, an initial threshold T, the number of limit iteration J, and the like. The data placement decision request, the initial threshold T, the number of limit iteration J will be described later. Furthermore, a user operates the input unit 120 and inputs query data to the checking unit 170, thereby the user performs a check request.

The matching management unit 130 is an example of a setting unit. If the matching management unit 130 acquires a data placement decision request, the matching management unit 130 updates the placement destination information 115 in accordance with the data placement decision request. Furthermore, on the basis of the placement destination information 115, the matching management unit 130 notifies the candidate data selecting unit 140 of the data in which the placement destination has not been determined and then acquires the candidate data from the candidate data selecting unit 140. The candidate data is associated with each of the pieces of the candidate data illustrated in FIGS. 1 to 11. The matching management unit 130 outputs the candidate data to the matching calculating unit 150 and acquires, from the matching calculating unit 150, information on the placement destination of each of the pieces of the candidate data. The matching management unit 130 updates the placement destination information 115 on the basis of the information related to the placement destination of each of the pieces of the candidate data acquired from the matching calculating unit 150. The matching management unit 130 repeatedly performs the process described above until the number of times of the process performed reaches the number of limit iteration J.

A process performed when the matching management unit 130 acquires a data placement decision request will be specifically described. For example, the data placement decision request includes therein an "all redo request" or a "data count equalization update request". A description will be given of a case in which the all redo request is included in the data placement decision request. The matching management unit 130 accesses the placement destination information 115 and sets each of the placement destinations to undefined.

A description will be given of a case in which the data count equalization update request is included in the data placement decision request. As a prerequisite, from among the pieces of data in the record data 110, the number of pieces of data distributed in each of the computational resources 1 to N is represented by n1 to nN. Furthermore, the minimum number of pieces of data from among n1 to nN is represented by "n_*". The matching management unit 130 randomly selects, from the record data 110, n1-n_* pieces of data out of the pieces of data that are determined to be placed in the computational resource 1 and sets the placement destination of the selected data to undefined. The matching management unit 130 also performs the same process on the pieces of data that are determined to be placed in the computational resources 2 to N.

The candidate data selecting unit 140 is an example of a selecting unit. The candidate data selecting unit 140 receives a notification from the matching management unit 130 of the data whose placement destination is undefined. The data set in which the placement destination is undefined is referred to as a data set X'. The candidate data selecting unit 140 randomly selects N pieces of data from the data set X' and outputs the selected data as candidate data to the matching management unit 130. If the number of pieces of data included in the data set X' is less than N, the candidate data selecting unit 140 outputs the data set X' as the candidate data to the matching management unit 130.

The matching calculating unit 150 acquires each of the pieces of the candidate data from the matching management unit 130 and determines the placement destination of each of the pieces of the acquired candidate data. The matching calculating unit 150 notifies the matching management unit 130 of the information related to the placement destination of each of the pieces of the candidate data.

In the following, the process performed by the matching calculating unit 150 will be specifically described. As a prerequisite, each of the pieces of the candidate data is represented by v1, v2, ..., and vN'. Each of the computational resources are represented by s1, s2, ..., and sN. However, it is assumed that the relationship between N' and N satisfies Equation (1).

$$\text{ceil}(N'/N)=1 \qquad (1)$$

The matching calculating unit 150 calculates the similarities between the candidate data vi and the data placed in a computational resource sj and all of the pieces of the data in which the placement destination is defined. From among the similarities between the candidate data vi and the data placed in the computational resource sj and all of the pieces of the data in which the placement destination is defined, the maximum value is referred to as $d_{ij}$.

The matching calculating unit 150 creates an N'×N matrix D in which the maximum value $d_{ij}$ of the similarity is indicated by an (i, j) element. The matching calculating unit 150 sorts the $i^{th}$ row of the matrix D in ascending order and determines the order of the computational resource sj with respect to the candidate data vi. On the basis of the determined order, the matching calculating unit 150 creates a wish list Lvi of the candidate data vi. At this time, there may be a case of $d_{ij}=d_{ij'}$ when j!=j'; however, either one may be ranked first.

The matching calculating unit 150 sorts the $j^{th}$ column of the matrix D in ascending order and determines the order of the candidate data vi with respect to the computational resource sj. On the basis of the determined order, the matching calculating unit 150 creates a wish list Lsj of the computational resource sj.

The matching calculating unit 150 obtains a stable matching by using the wish lists Lvi, ..., and LvN' of the pieces of the candidate data, the wish lists Lsj, ..., and Lsj of the computational resources, and the extended GS algorithm. When the matching calculating unit 150 uses the extended GS algorithm, either one of the candidate data side and the computational resource side may propose. The matching calculating unit 150 notifies the matching management unit 130 of the information related to the placement destination of each of the pieces of the candidate data on the basis of the matching result.

The placement processing unit 160 is a processing unit that places, on the basis of the placement destination information 115, each of the pieces of the data included in the record data 110 to the computational resources 1 to N.

The checking unit 170 is a processing unit that checks each of the computational resources 1 to N against query data when the query data is acquired from the input unit 120. The checking unit 170 outputs the check result to a display device (not illustrated) or the like.

Figure 17:
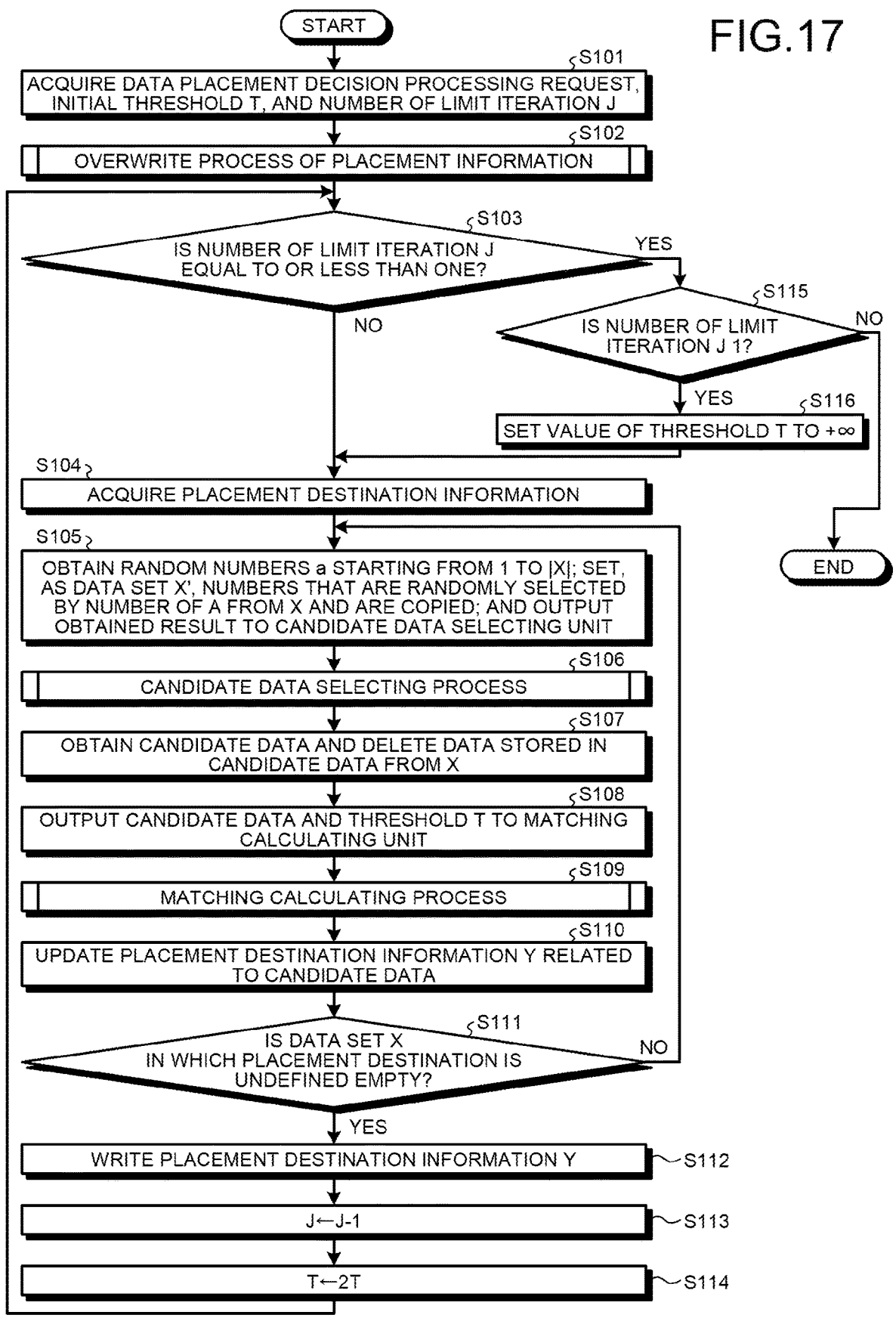
FIG. 17 is a flowchart illustrating an example of the flow of a process performed by the data placement device according to the embodiment.

In the following, an example of the flow of a process performed by the data placement device 100 according to the embodiment will be described. FIG. 17 is a flowchart illustrating an example of the flow of a process performed by the data placement device according to the embodiment. As illustrated in FIG. 17, the matching management unit 130 in the data placement device 100 acquires a data placement decision processing request, the initial threshold T, and the number of limit iteration J (Step S101).

The matching management unit 130 performs an overwrite process of the placement information (Step S102). The matching management unit 130 determines whether the number of limit iteration J is equal to or less than one (Step S103). If the number of limit iteration J is not equal to or less than one (No at Step S103), the matching management unit 130 acquires the placement destination information 115 (Step S104).

The matching management unit 130 obtains random numbers of "a" starting from 1 to |X|; sets, as the data set X', the numbers that are randomly selected by the number of "a" from X and that are copied; and outputs the obtained result to the candidate data selecting unit 140 (Step S105). At Step S105, it is assumed that "X" is a data set in which the placement destination is undefined.

The candidate data selecting unit 140 in the data placement device 100 performs the candidate data selecting process (Step S106). The matching management unit 130 obtains the candidate data from the candidate data selecting unit 140 and deletes the data stored in the candidate data from X (Step S107).

The matching management unit 130 outputs the candidate data and the threshold T to the matching calculating unit 150 (Step S108). The matching calculating unit 150 performs the matching calculating process (Step S109).

The matching management unit 130 acquires the information related to the placement destination of the candidate data from the matching calculating unit 150 and updates the placement destination information Y related to the candidate data (Step S110). The matching management unit 130 determines whether data set X in which the placement destination is undefined is empty (Step S111).

If data set X in which the placement destination is undefined is not empty (No at Step S111), the matching management unit 130 proceeds to Step S105. In contrast, if data set X in which the placement destination is undefined is empty (Yes at Step S111), the matching management unit 130 writes the placement destination information Y into the placement destination information 115 (Step S112).

The matching management unit 130 updates the value of the number of limit iteration J by using the value obtained by subtracting 1 from the number of limit iteration J (Step S113). The matching management unit 130 updates the value of T by the value of 2T that is twice as many as the threshold (Step S114) and proceeds to Step S103.

At Step S103, if the number of limit iteration J is equal to or less than 1 (Yes at Step S103), the matching management unit 130 determines whether the number of limit iteration J is 1 (Step S115). If the number of limit iteration J is not 1 (No at Step S115), the matching management unit 130 ends the process.

In contrast, if the number of limit iteration J is 1 (Yes at Step S115), the matching management unit 130 sets the value of the threshold T to +∞ (Step S116) and proceeds to Step S104.

Figure 18:
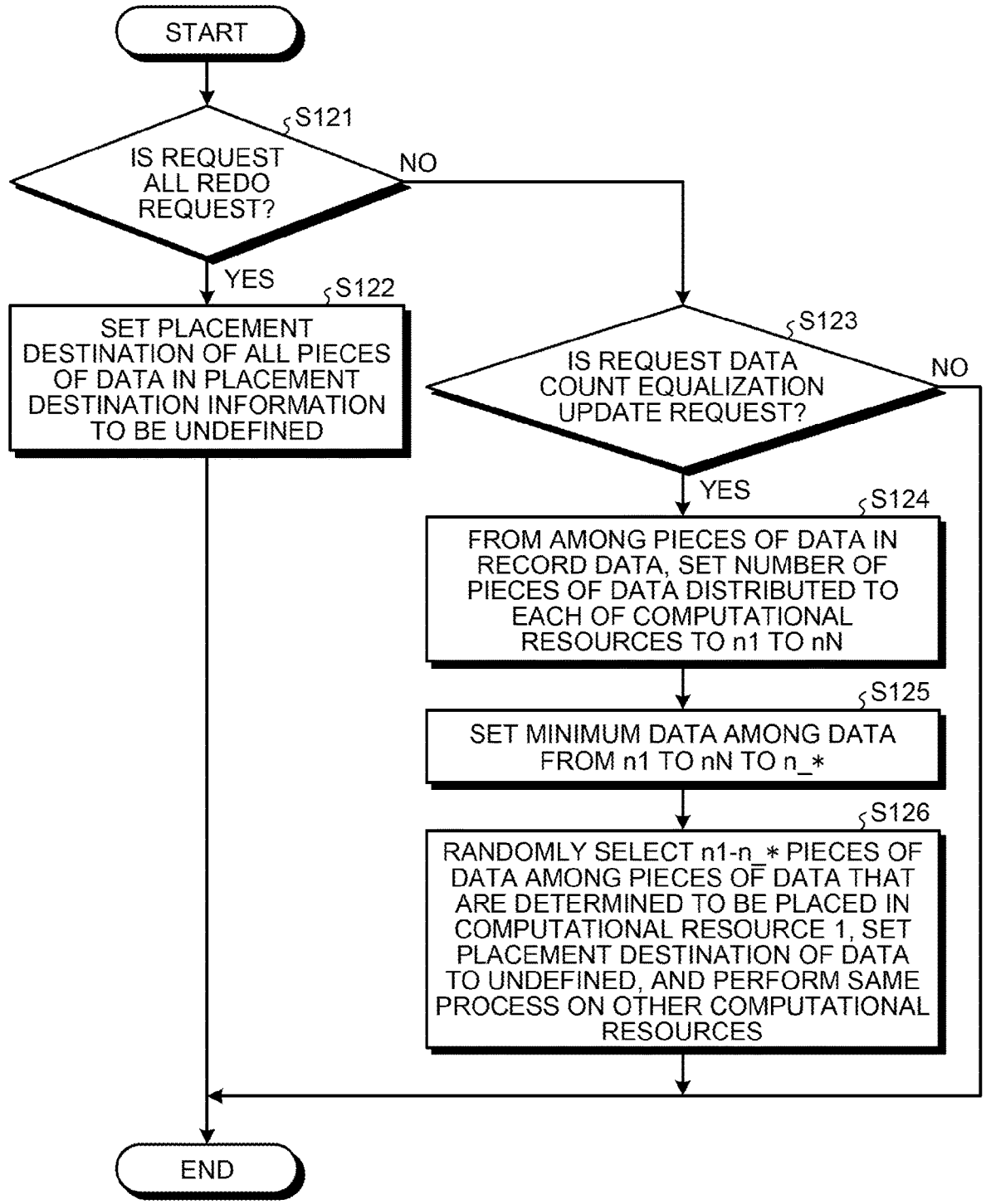
FIG. 18 is a flowchart illustrating the flow of an overwriting process performed on placement information.

In the following, a description will be given of the flow of the overwrite process performed on the placement information indicated at Step S102 illustrated in FIG. 17. FIG. 18 is a flowchart illustrating the flow of an overwriting process performed on placement information. As illustrated in FIG. 18, the matching management unit 130 in the data placement device 100 determines whether the data placement decision request is the all redo request (Step S121).

If the data placement decision request is the all redo request (Yes at Step S121), the matching management unit 130 sets the placement destination of all of the pieces of the data in the placement destination information 115 to undefined (Step S122) and ends the overwrite process performed on the placement information.

In contrast, if the data placement decision request is not the all redo request (No at Step S121), the matching management unit 130 determines whether the request is the data count equalization update request (Step S123). If the request is not the data count equalization update request (No at Step S123), the matching management unit 130 ends the overwrite process performed on the placement information.

In contrast, if the request is the data count equalization update request (Yes at Step S123), the matching management unit 130 sets the number of pieces of the data, from among the pieces of the data in the record data 110, distributed to each of the computational resources to n1 to nN (Step S124).

The matching management unit 130 sets, to n_*, the minimum data among the data starting from n1 to nN (Step S125). The matching management unit 130 randomly selects n1-n_* pieces of data from among the pieces of the data that are determined to be placed in the computational resource 1 and then sets the placement destination of the subject data to undefined.

Furthermore, the matching management unit 130 performs the same process on the other computational resources (Step S126).

Figure 19:
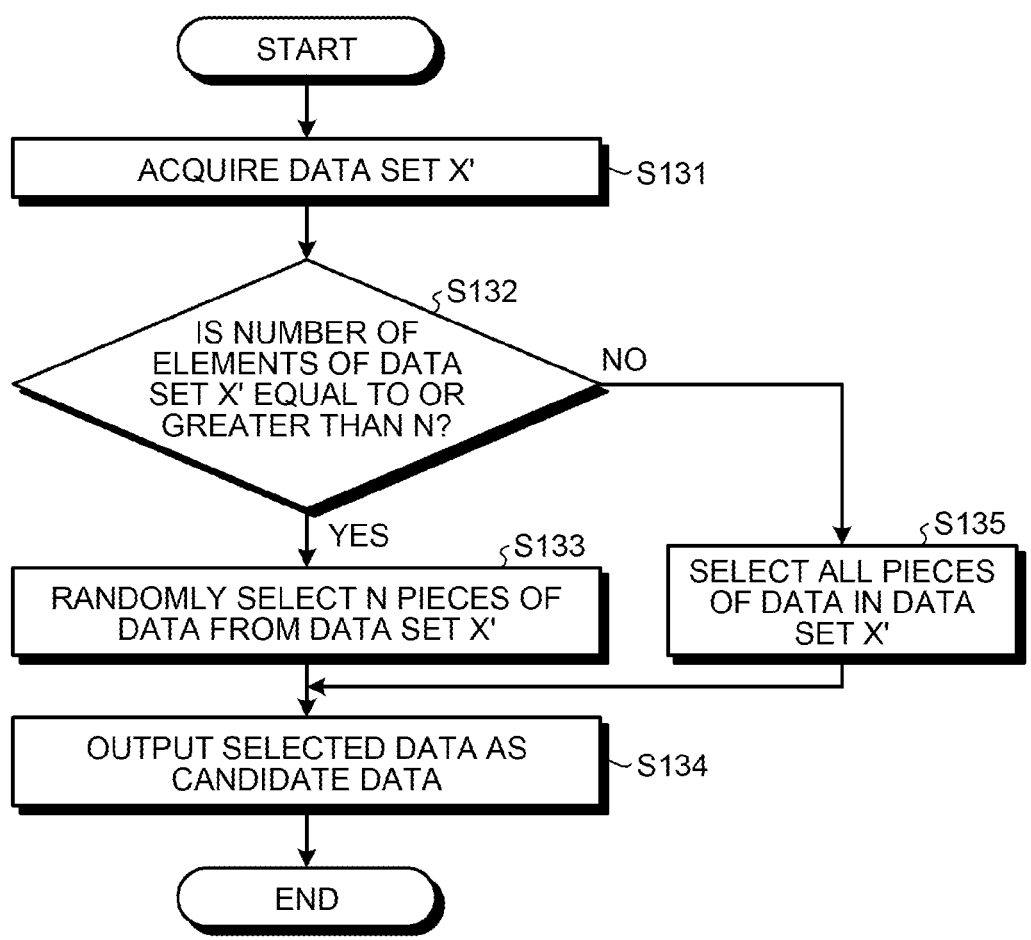
FIG. 19 is a flowchart (1) illustrating the flow of a candidate data selecting process.

In the following, a description will be given of the flow of the candidate data selecting process indicated at Step S106 illustrated in FIG. 17. FIG. 19 is a flowchart (1) illustrating the flow of a candidate data selecting process. As illustrated in FIG. 19, the candidate data selecting unit 140 in the data placement device 100 acquires the data set X' (Step S131).

The candidate data selecting unit 140 determines whether the number of elements of the data set X' is equal to or greater than N (Step S132). If the number of elements of the data set X' is equal to or greater than N (Yes at Step S132), the candidate data selecting unit 140 randomly selects N pieces of data from the data set X' (Step S133). The candidate data selecting unit 140 outputs the selected data as the candidate data (Step S134).

In contrast, if the number of elements of the data set X' is not equal to or greater than N (No at Step S132), the candidate data selecting unit 140 selects all of the pieces of data in the data set X' (Step S135) and proceeds to Step S134.

Figure 20:
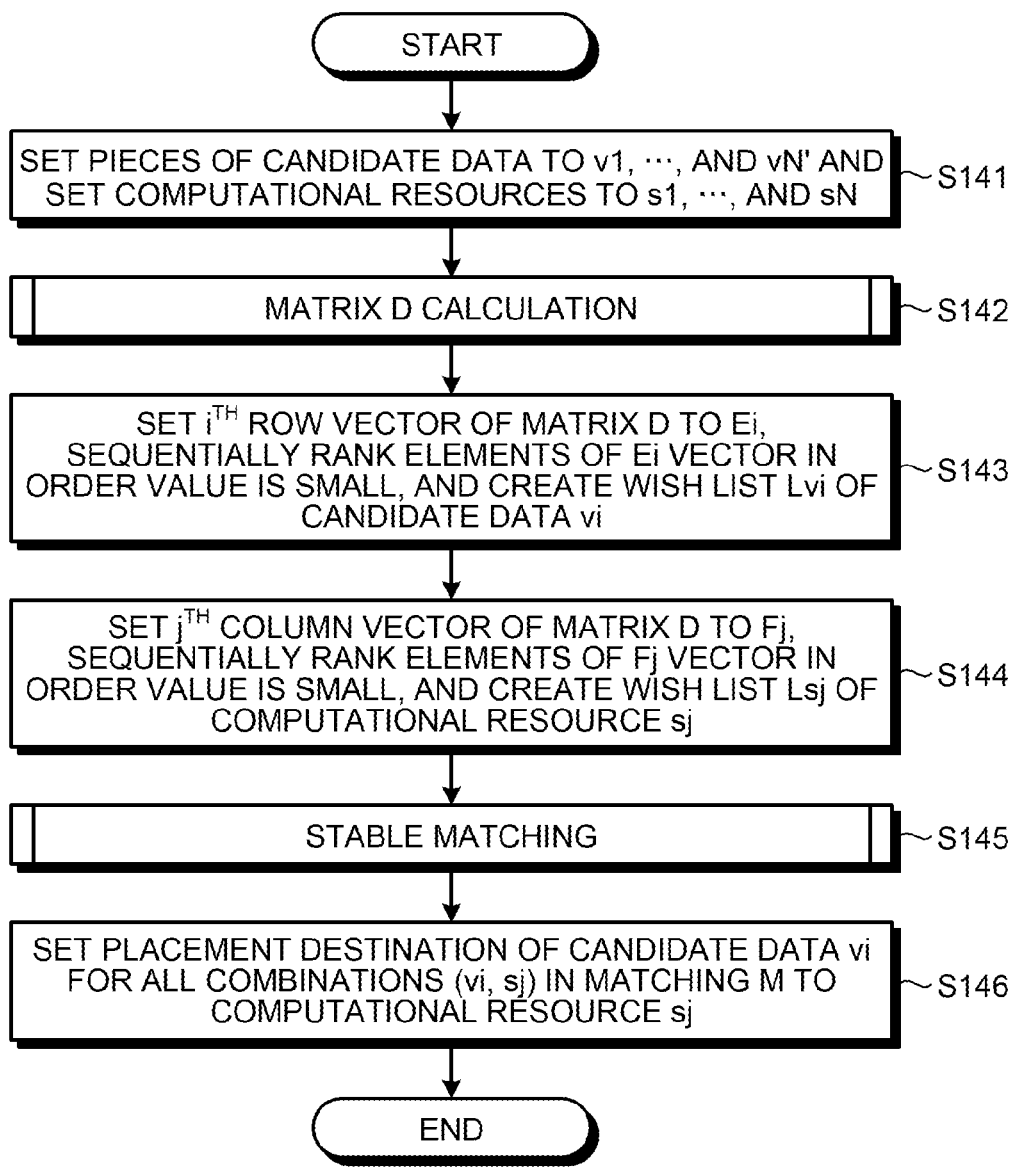
FIG. 20 is a flowchart (1) illustrating the flow of a matching calculating process.

In the following, the flow of the matching calculating process indicated at Step S109 illustrated in FIG. 17 will be described. FIG. 20 is a flowchart (1) illustrating the flow of a matching calculating process. The matching calculating unit 150 in the data placement device 100 sets the pieces of the candidate data to v1, . . . , and vN' and sets the computational resources to s1, . . . , and sN (Step S141).

The matching calculating unit 150 performs calculation of the matrix D (Step S142). The matching calculating unit 150 sets the $i^{th}$ row vector of the matrix D to Ei. The matching calculating unit 150 sequentially ranks the elements of the Ei vector in the order the value is small and creates a wish list Lvi of the candidate data vi (Step S143).

The matching calculating unit 150 sets the $j^{th}$ column vector of the matrix D to Fj. The matching calculating unit 150 sequentially ranks the elements of the Fj vector in the order the value is small and creates a wish list Lsj of the computational resource sj (Step S144).

The matching calculating unit 150 performs the stable matching (Step S145). The stable matching at Step S145 is performed in accordance with the extended GS algorithm.

When the matching calculating unit 150 uses the extended GS algorithm, either one of the candidate data side and the computational resource side may propose.

The matching calculating unit 150 sets the placement destination of the candidate data vi for all of the combinations (vi, sj) in the matching M to the computational resource sj (Step S146).

Figure 21:
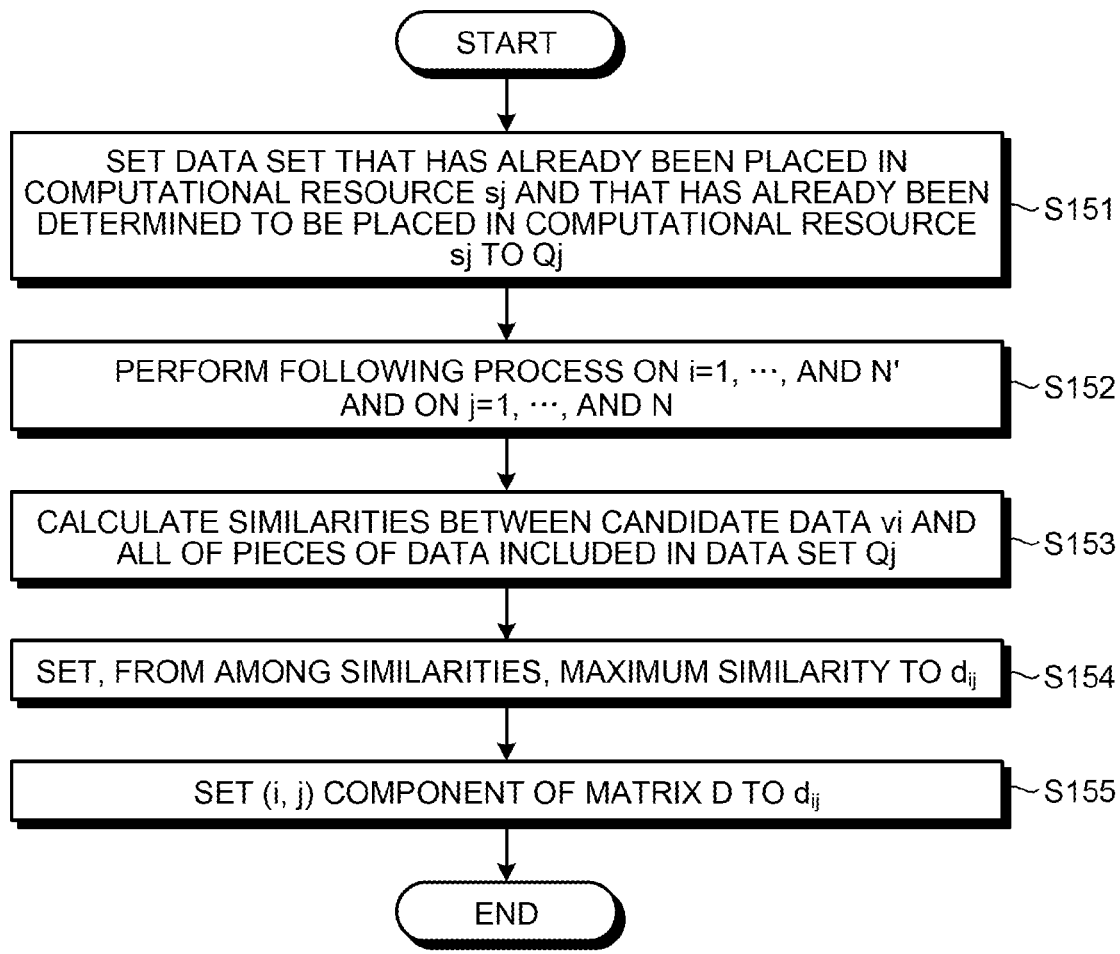
FIG. 21 is a flowchart (1) illustrating the flow of a process of calculating a matrix D.

In the following, the flow of the process of calculating the matrix D illustrated in FIG. 20 will be described. FIG. 21 is a flowchart (1) illustrating the flow of a process of calculating a matrix D. As illustrated in FIG. 21, the matching calculating unit 150 in the data placement device 100 sets, to Qj, the data set that has already been placed in the computational resource sj and that has already been determined to be placed in the computational resource sj (Step S151). The matching calculating unit 150 performs the following process on i=1, . . . , and N' and on j=1, . . . , and N (Step S152).

The matching calculating unit 150 calculates the similarities between the candidate data vi and all of the pieces of data included in the data set Qj (Step S153). The matching calculating unit 150 sets, from among the similarities, the maximum similarity to $d_{ij}$ (Step S154). The matching calculating unit 150 sets the component (i, j) of the matrix D to $d_{ij}$ (Step S155).

In the following, the advantage of the data placement device 100 according to the embodiment will be described. For each of the plurality of the candidate data selected by the candidate data selecting unit 140, the data placement device 100 creates, as the similarity index, from the similarities calculated with respect to each of the computational resources 1 to N, a wish list related to each of the pieces of the candidate data and a wish list related to each of the computational resources 1 to N. By performing the stable matching on the basis of the wish list related to each of the pieces of the candidate data and the wish list related to each of the computational resources 1 to N, the data placement device 100 allocates the plurality of pieces of the candidate data to each of the computational resources 1 to N. Consequently, with the data placement device 100, when the data is placed in a plurality of the computational resources, it is possible to prevent an increase in similarities of data placed in the same computational resource while substantially equalizing the data allocated to each of the computational resources.

Furthermore, when the data placement device 100 performs the stable matching, the data placement device 100 allows certain candidate data to propose to the computational resource prioritized for the candidate data and determines whether the similarity of the certain candidate data is smaller than the candidate data that has already been paired with the proposed computational resource. If the similarity of, with respect to the computational resource, the certain candidate data is smaller than the similarity of the candidate data that has already been paired, the data placement device 100 pairs the proposed candidate data with the computational resource. Consequently, the data placement device 100 can efficiently perform the stable matching in which no blocking pair is present.

Furthermore, the data placement device 100 sets the minimum data from among data n1 to nN to n_*, randomly selects n1-n_* pieces of data from among the pieces of the data that have been determined to be placed in each of the computational resources, and sets the placement destination of the selected data to undefined. By performing this process, it is possible to prevent an increase in similarities of data placed in the same computational resource.

However, the process performed by the candidate data selecting unit 140 and the matching calculating unit 150 illustrated in FIG. 14 is only an example. In the following, another process performed by the candidate data selecting unit 140 and the matching calculating unit 150 will be described.

A description will be given of another process (1) performed by the candidate data selecting unit 140. The candidate data selecting unit 140 acquires, from the matching management unit 130, information on the data set X' in which the placement destination has not been determined. The candidate data selecting unit 140 randomly selects, from the data set X', pieces of data by the number of pieces corresponding to a factor of N and then outputs the selected data to the matching management unit 130 as the candidate data. If the number of pieces of data included in the data set X' is less than N, the candidate data selecting unit 140 outputs the entirety of the data set X' to the matching management unit 130 as the candidate data.

Figure 22:
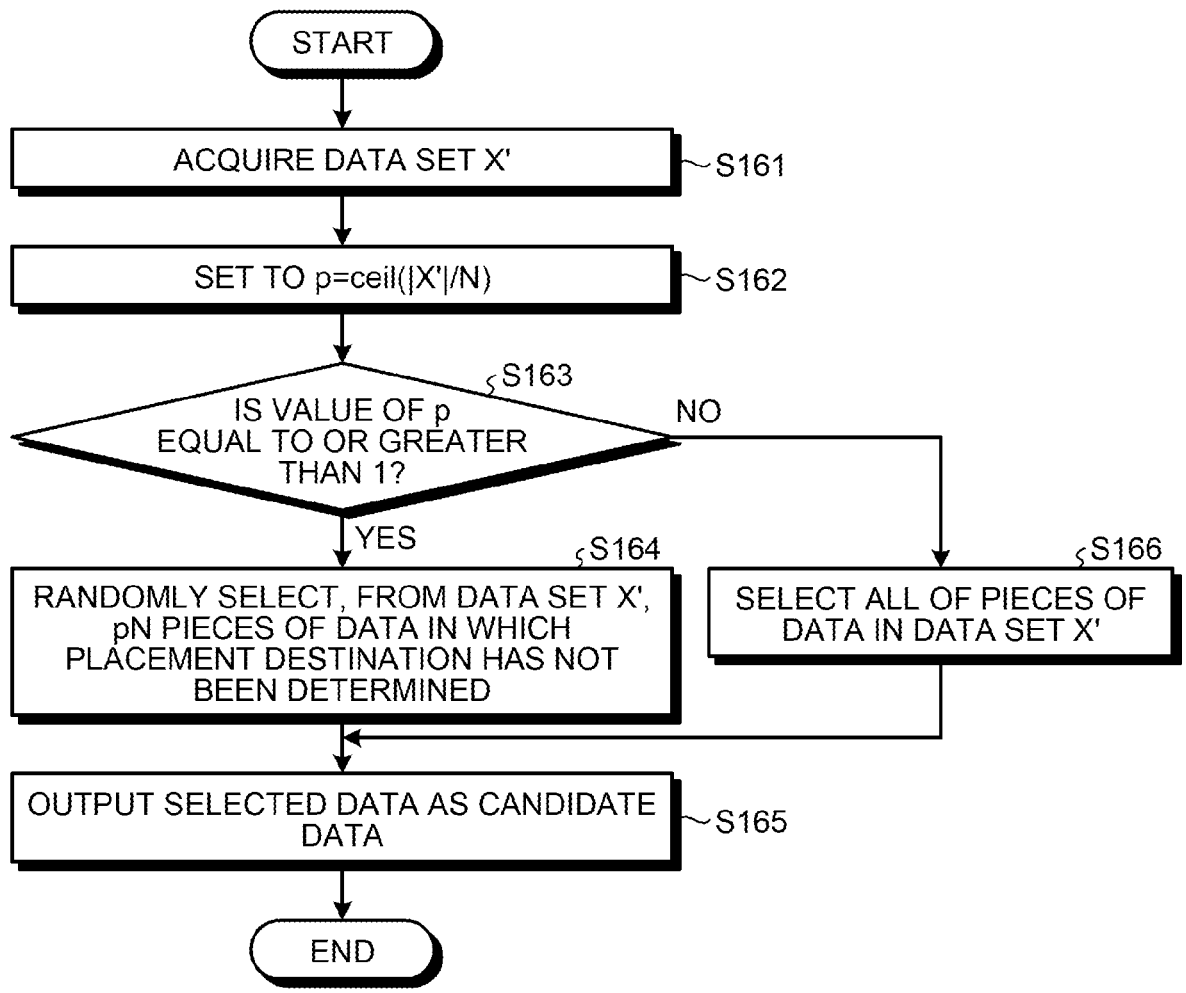
FIG. 22 is a flowchart (2) illustrating the flow of a candidate data selecting process.

FIG. 22 is a flowchart (2) illustrating the flow of a candidate data selecting process. As illustrated in FIG. 22, the candidate data selecting unit 140 acquires the data set X' (Step S161). The candidate data selecting unit 140 sets to p=ceil(|X'|/N) (Step S162).

The candidate data selecting unit 140 determines whether the value of p is equal to or greater than 1 (Step S163). If the value of p is equal to or greater than 1 (Yes at Step S163), the candidate data selecting unit 140 randomly selects, from the data set X', pN pieces of data in which the placement destination has not been determined (Step S164). The candidate data selecting unit 140 outputs the selected data as the candidate data (Step S165).

If the value of p is not equal to or greater than 1 (No at Step S163), the candidate data selecting unit 140 selects all of the pieces of the data in the data set X' (Step S166) and proceeds to Step S165.

In the following, a description will be given of another process (2) performed by the candidate data selecting unit 140. The candidate data selecting unit 140 acquires, from the matching management unit 130, information on the data set X' in which the placement destination has not been determined. The candidate data selecting unit 140 assigns each of the pieces of the data in the data set X' to random numbers that are equal to or greater than 0 and that are less than 1. The candidate data selecting unit 140 adds, on the basis of the numbers assigned to the pieces of the data, the data with the number of 0.5 or more to the set A.

The candidate data selecting unit 140 divides the data in the set A into K clusters by using a k-medoid method or the like. For example, K is a value determined by "K=ceil(A/N)". At this time, the number of pieces of the data belonging to each cluster is about N. The candidate data selecting unit 140 randomly selects a single cluster and sets the number of pieces of the data belonging to the selected cluster to M.

If the M pieces of data in the selected cluster are equal to or greater than N, the candidate data selecting unit 140 selects N pieces of data from the selected cluster and then outputs the selected data to the matching management unit 130 as the candidate data.

In contrast, a description will be given of a case in which the M pieces of data in the selected cluster selected by the candidate data selecting unit 140 is less than N. The candidate data selecting unit 140 sets all of the pieces of the data in the data belonging to the selected cluster as the candidate data.

Furthermore, if the number of pieces of the data in the data set A that does not belong to the selected cluster is equal to or greater than N-M, the candidate data selecting unit 140 randomly selects N-M pieces of data from among the pieces of the data in the data set A that does not belong to the selected cluster and adds the data to the candidate data. In contrast, if the number of pieces of the data in the data set A that does not belong to the selected cluster is less than N-M, the candidate data selecting unit 140 selects all of the pieces of the data in the data set A that does not belong to the selected cluster and adds the data to the candidate data. The candidate data selecting unit 140 outputs the candidate data to the matching management unit 130.

Figure 23:
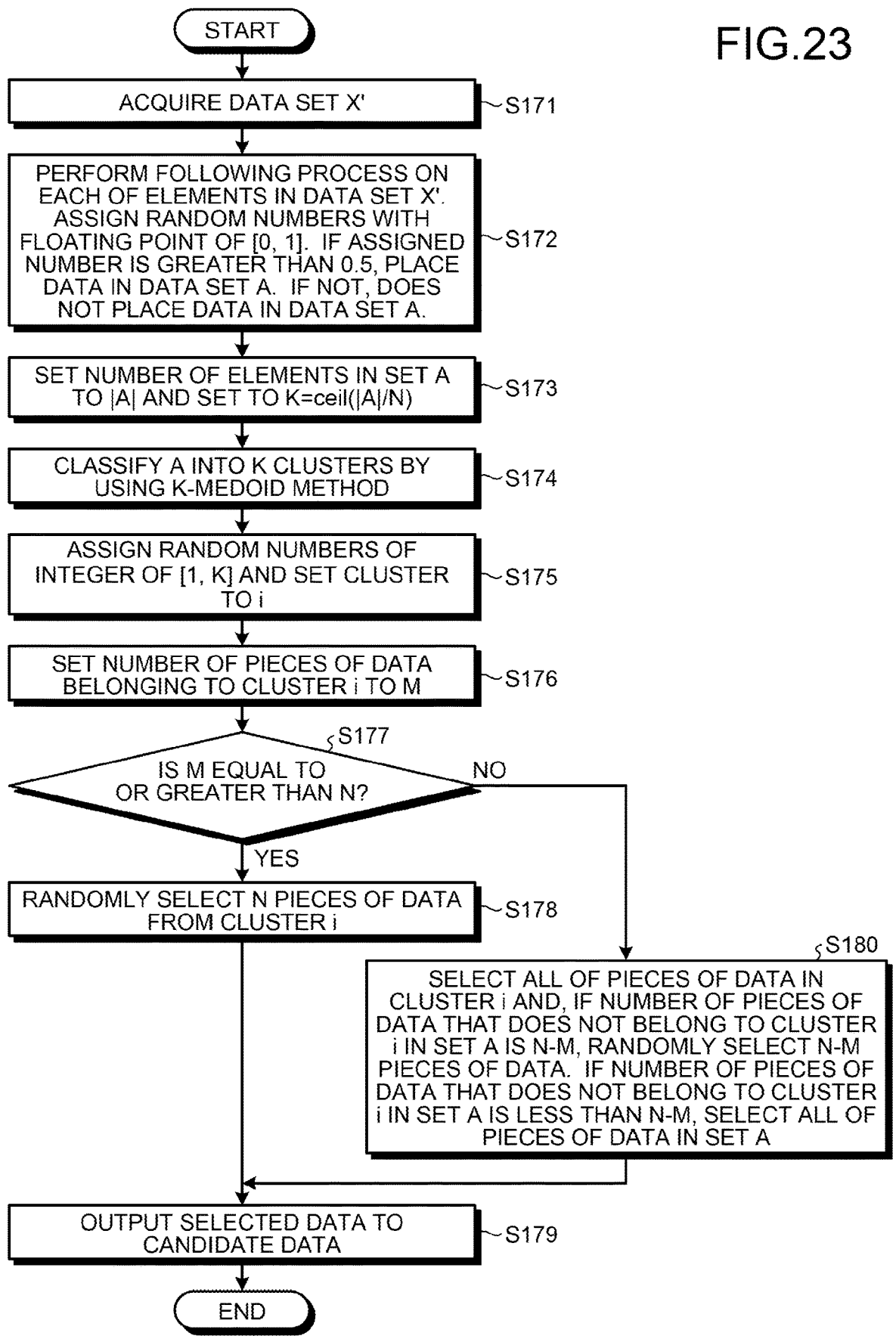
FIG. 23 is a flowchart (3) illustrating the flow of a candidate data selecting process.

FIG. 23 is a flowchart (3) illustrating the flow of a candidate data selecting process. As illustrated in FIG. 23, the candidate data selecting unit 140 acquires the data set X' (Step S171). The candidate data selecting unit 140 performs the following process on each of the elements in the data set X'. The candidate data selecting unit 140 assigns random numbers with floating point of [0, 1] to the data in the data set X'. The candidate data selecting unit 140 sets the data with the assigned value greater than 0.5 in the set A. The candidate data selecting unit 140 does not set the data with the assigned value equal to or less than 0.5 in the set A (Step S172).

The candidate data selecting unit 140 sets the number of elements in the set A to |A| and sets to K=ceil(|A|/N) (Step S173). The candidate data selecting unit 140 classifies A into K clusters by using the k-medoid method or the like (Step S174).

The candidate data selecting unit 140 assigns the random numbers with the integer of [1, K] to each cluster and sets the cluster to i (Step S175). The candidate data selecting unit 140 sets the number of pieces of the data belonging to the cluster i to M (Step S176).

The candidate data selecting unit 140 determines whether M is equal to or greater than N (Step S177). If M is equal to or greater than N (Yes at Step S177), the candidate data selecting unit 140 randomly selects N pieces of data from the cluster i (Step S178). The candidate data selecting unit 140 outputs the selected data to the candidate data (Step S179).

In contrast, if M is less than N (No at Step S177), the candidate data selecting unit 140 proceeds to Step S180. The candidate data selecting unit 140 selects all of the pieces of the data in the cluster i. Furthermore, if the number of pieces of the data that does not belong to the cluster i in the set A is N-M, the candidate data selecting unit 140 randomly selects N-M pieces of data. If the number of pieces of the data that does not belong to the cluster i in the set A is less than N-M, the candidate data selecting unit 140 selects all of the pieces of the data in the set A (Step S180). The candidate data selecting unit 140 proceeds to Step S179.

In the following, a description will be given of another process (3) performed by the candidate data selecting unit 140. The candidate data selecting unit 140 acquires, from the matching management unit 130, information on the data set X' in which the placement destination has not been determined. The candidate data selecting unit 140 assigns random numbers that are equal to or greater than 0 and that are less than 1 to each of the pieces of the data in the data set X'. The candidate data selecting unit 140 adds, to the set A on the basis of the number assigned to each of the piece of data, the pieces of the data with the assigned number equal to or greater than 0.5.

The candidate data selecting unit 140 divides, by using the k-medoid method or the like, the data in the set A into K clusters. For example, K is a value determined on the basis of "K=ceil(A/N)". The candidate data selecting unit 140 selects all of the clusters in which the number of pieces of data belonging to each of the clusters is equal to or greater than N. The candidate data selecting unit 140 randomly selects N pieces of data from the selected clusters and outputs the selected data as the candidate data. In such a case, the number of pieces of the candidate data to be selected is a factor of N.

Figure 24:
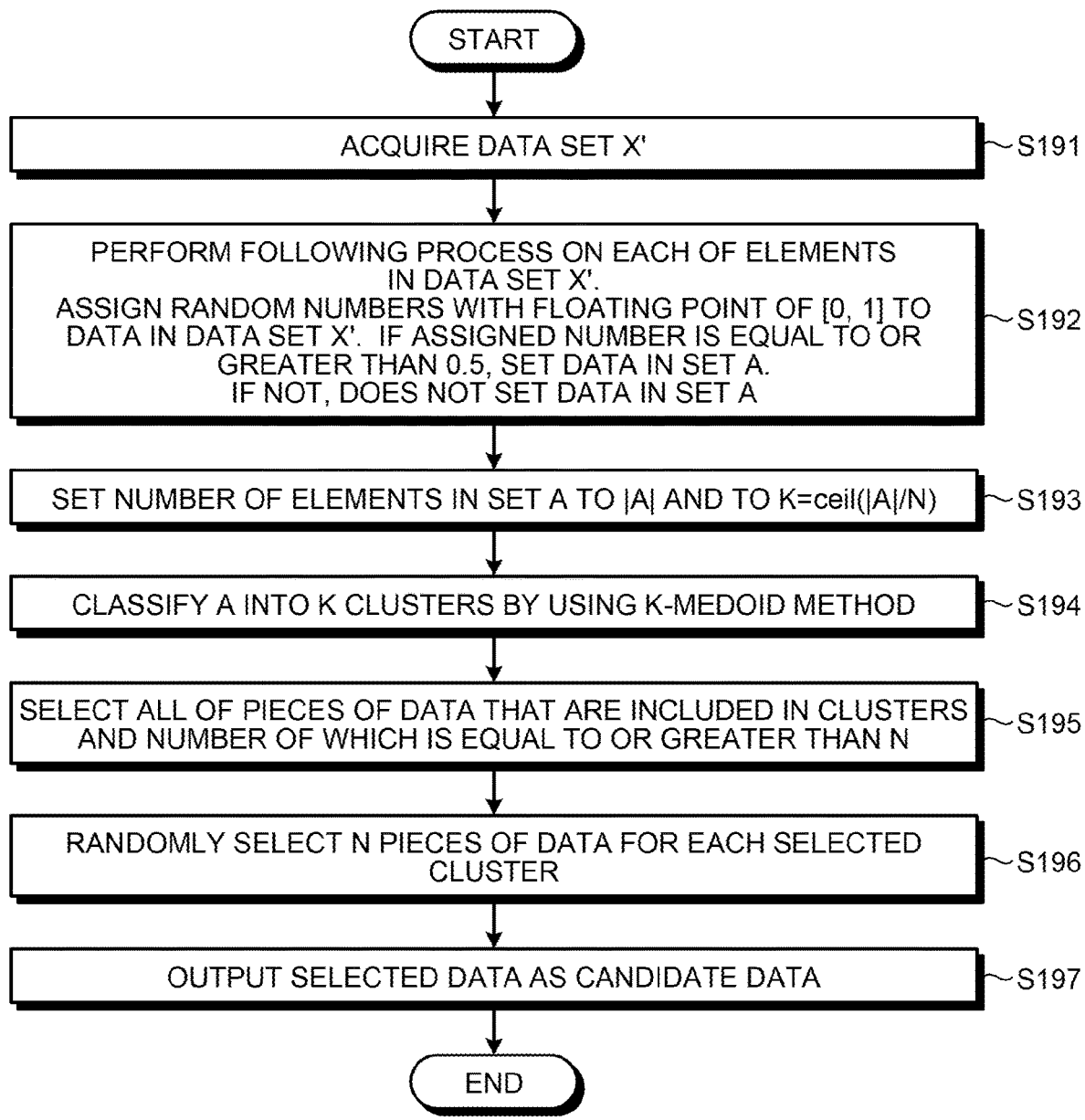
FIG. 24 is a flowchart (4) illustrating the flow of a candidate data selecting process.

FIG. 24 is a flowchart (4) illustrating the flow of a candidate data selecting process. As illustrated in FIG. 24, the candidate data selecting unit 140 acquires the data set X' (Step S191). The candidate data selecting unit 140 performs the following process on each of the elements in the data set X'. The candidate data selecting unit 140 assigns random numbers with floating point of [0, 1] to the data in the data set X'. The candidate data selecting unit 140 puts the data with the assigned value equal to or greater than 0.5 in the set A. The candidate data selecting unit 140 does not put the data with the assigned value equal to or less than 0.5 in the set A (Step S192).

The candidate data selecting unit 140 sets the number of elements in the set A to |A| and sets to K=ceil(|A|/N) (Step S193). The candidate data selecting unit 140 classifies A into K clusters by using the k-medoid method (Step S194).

The candidate data selecting unit 140 selects all of the pieces of data that are included in the clusters and the number of which is equal to or greater than N (Step S195). The candidate data selecting unit 140 randomly selects N pieces of data for each selected cluster (Step S196). The candidate data selecting unit 140 outputs the selected data as the candidate data (Step S197).

In the following, a description will be given of another process (1) performed by the matching calculating unit 150. The flow of the process of calculating the matrix D performed by the matching calculating unit 150 described here is different from that performed by the matching calculating unit described. Specifically, the matching calculating unit 150 calculates the similarities between the candidate data vi and the data placed in the computational resource sj and all of the pieces of the data in which the placement destination has already been determined. From among the similarities between the candidate data vi and the data placed in the computational resource sj and all of the pieces of the data in which the placement destination has already been determined, the matching calculating unit 150 sets the top k average values to the component of (i, j) of the matrix D.

Figure 25:
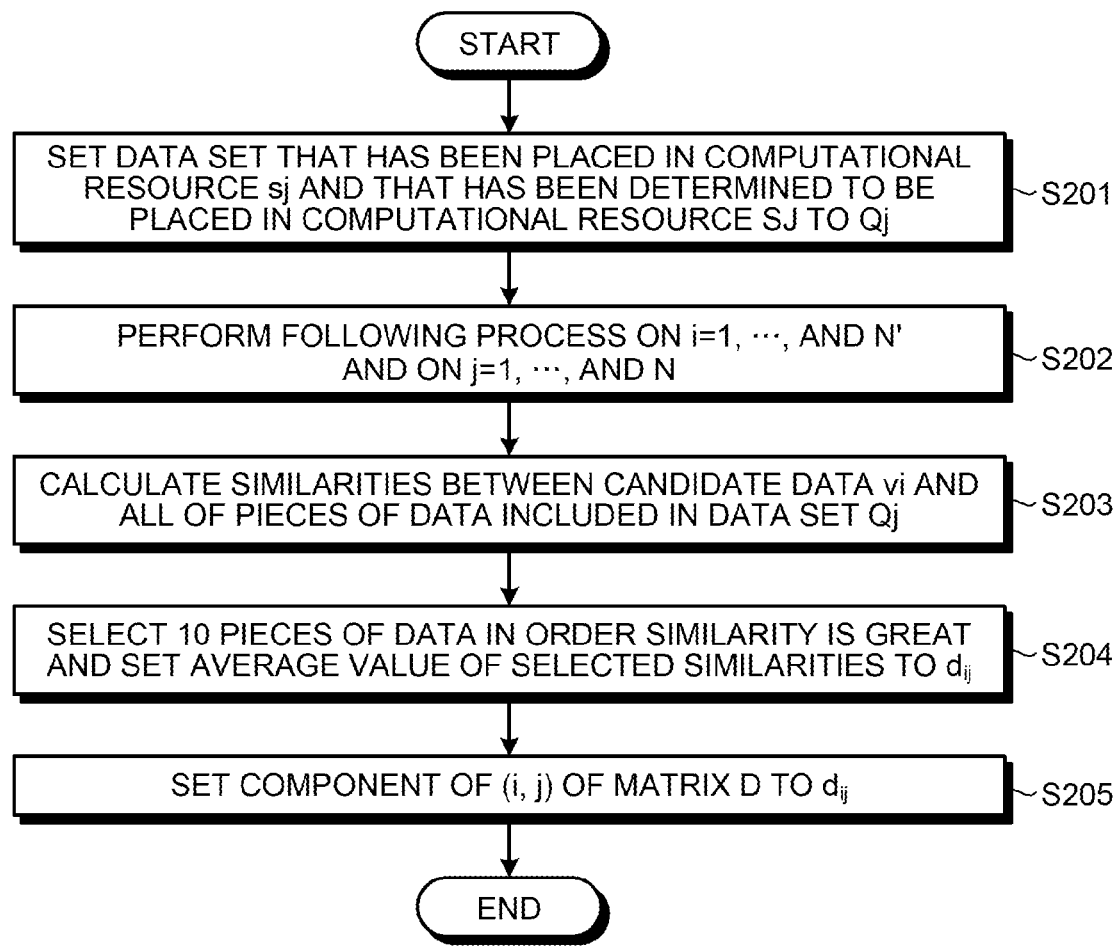
FIG. 25 is a flowchart (2) illustrating the flow of a process of calculating the matrix D.

FIG. 25 is a flowchart (2) illustrating the flow of a process of calculating the matrix D. As illustrated in FIG. 25, the matching calculating unit 150 sets the data set that has been placed in the computational resource sj and that has been determined to be placed in the computational resource sj to Qj (Step S201). The matching calculating unit 150 performs the following process on i=1, . . . , and N' and on j= 1, . . . , and N (Step S202).

The matching calculating unit 150 calculates the similarities between the candidate data vi and all of the pieces of the data included in the data set Qj (Step S203). The matching calculating unit 150 selects 10 pieces of data in the order the similarity is great and then sets the average value of the selected similarities to $d_{ij}$ (Step S204). The matching calculating unit 150 sets the component of (i, j) of the matrix D to $d_{ij}$ (Step S205).

In the following, a description will be given of another process (2) performed by the matching calculating unit 150. The flow of the process of calculating the matrix D performed by the matching calculating unit 150 described here is different from that performed by the matching calculating unit described above. Specifically, the matching calculating unit 150 calculates the similarities between the candidate data vi and the data placed in the computational resource sj and all of the pieces of the data in which the placement destination has been determined. The matching calculating unit 150 calculates the average m of all of the similarities and the standard deviation σ. The matching calculating unit 150 sets the value obtained by adding the average m to the standard deviation σ to the component of (i, j) of the matrix D.

Figure 26:
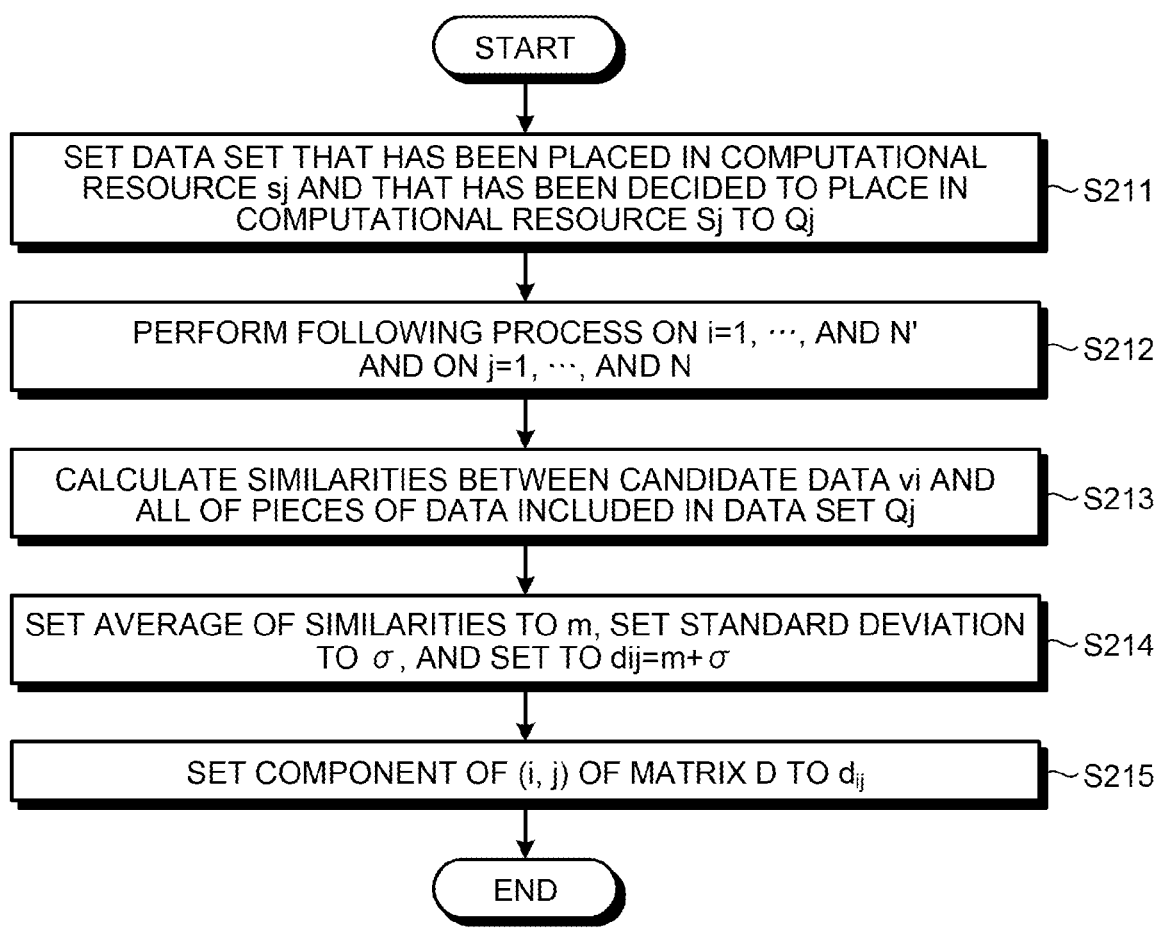
FIG. 26 is a flowchart (3) illustrating the flow of a process of calculating the matrix D.

FIG. 26 is a flowchart (3) illustrating the flow of a process of calculating the matrix D. As illustrated in FIG. 26, the matching calculating unit 150 sets the data set that has been placed in the computational resource sj and that has been decided to place in the computational resource sj to Qj (Step S211). The matching calculating unit 150 performs the following process on i=1, . . . , and N' and on j=1, . . . , and N (Step S212).

The matching calculating unit 150 calculates the similarities between all of the pieces of the data included in the data set Qj and the candidate data vi (Step S213). The matching calculating unit 150 sets the average of the similarities to m and sets the standard deviation to a. The matching calculating unit 150 sets to $d_{ij}$=m+σ (Step S214). The matching calculating unit 150 sets the component of (i, j) of the matrix D to $d_{ij}$ (Step S215).

In the following, a description will be given of another process (3) performed by the matching calculating unit 150. The matching calculating unit 150 acquires each of the pieces of the candidate data from the matching management unit 130. As a prerequisite, the pieces of the candidate data are set to v1, v2, . . . , and vN'. The computational resources are set to s1, s2, and sN. Furthermore, p is assumed to be an integer specified by p=ceil (N'/N).

The matching calculating unit 150 calculates the similarities between the candidate data vi and the pieces of data placed in the computational resource sj and all of the pieces of the data in which the placement destination of the computational resource sj has already been determined. From among all of the similarities between the candidate data vi and the data placed in the computational resource sj and all of the pieces of the data in which the placement destination of the computational resource sj has been determined, the matching calculating unit 150 represents the maximum value as $d_{ij}$.

The matching calculating unit 150 creates an N'×N matrix D in which the elements of (i, j) correspond to the maximum value $d_{ij}$ of the similarities. The matching calculating unit 150 sorts $i^{th}$ row of the matrix D in ascending order and determines the order of the computational resource sj with respect to the candidate data vi. The matching calculating unit 150 creates the wish list Lvi of the candidate data vi on the basis of the determined order. At this time, there may be a case in which $d_{ij}=d_{ij'}$ is obtained when j!=j'; however, either one may be first when the sorting is performed.

The matching calculating unit 150 sorts $j^{th}$ column of the matrix D and determines the order of the candidate data vi with respect to the computational resource sj. The matching calculating unit 150 creates a wish list Lsj of the computational resource sj on the basis of the determined order.

The matching calculating unit 150 calculates, as the hospitals/residents problem, the matching by using the wish lists Lvi, . . . , and LvN' of each of the pieces of the candidate data, the wish lists Lsj, . . . , and LsN of the computational resources and the quota of each of the hospitals as p. When the matching calculating unit 150 performs the matching, either one of the candidate data side and the computational resource side may propose. On the basis of the matching result, the matching calculating unit 150 notifies the matching management unit 130 of the information on the placement destination of each of the pieces of the candidate data.

Figure 27:
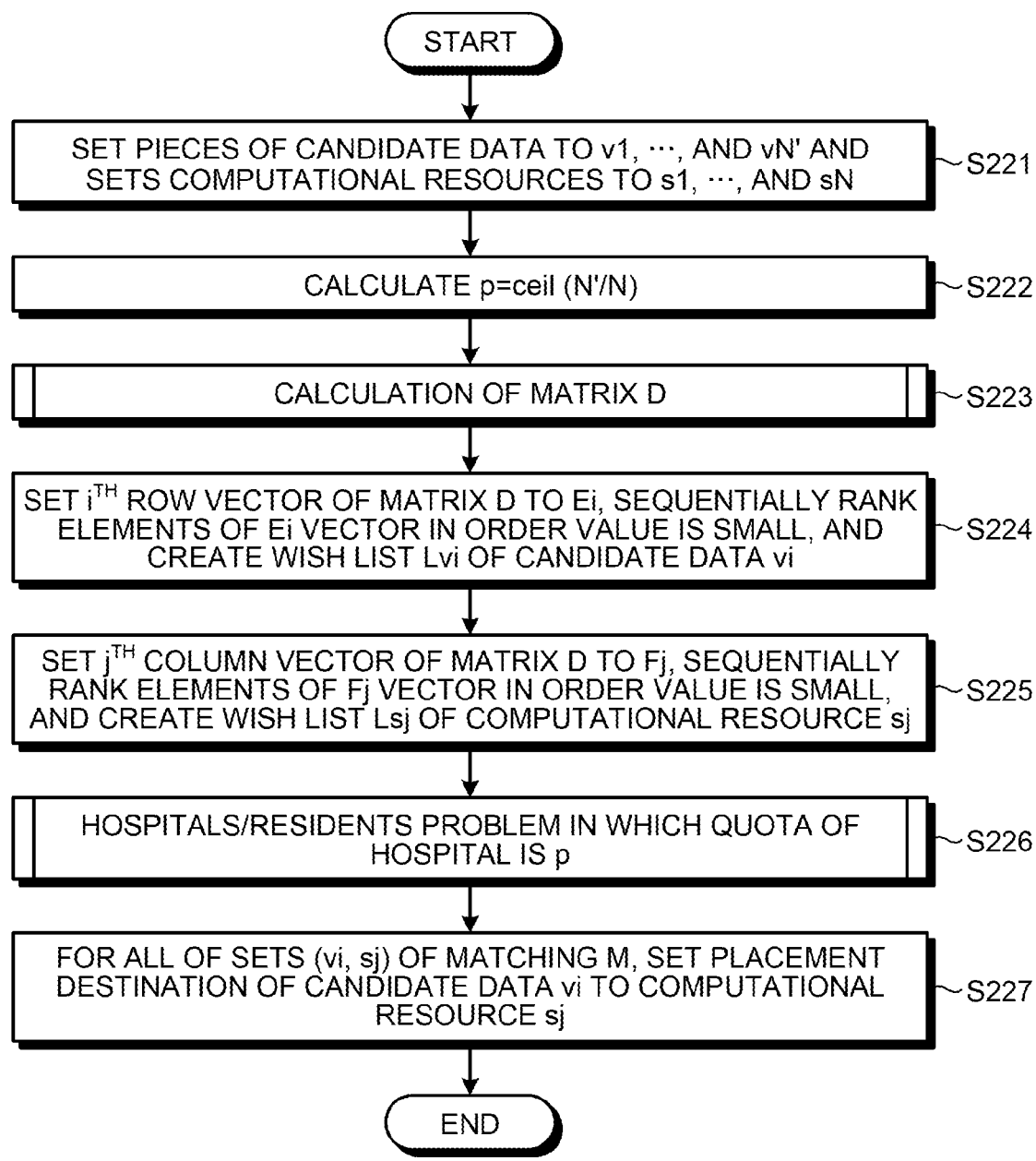
FIG. 27 is a flowchart (2) illustrating the flow of the matching calculating process.

FIG. 27 is a flowchart (2) illustrating the flow of the matching calculating process. As illustrated in FIG. 27, the matching calculating unit 150 sets the pieces of the candidate data to v1, . . . , and vN' and sets the computational resources to s1, . . . , and sN (Step S221). The matching calculating unit 150 calculates p=ceil (N'/N) (Step S222).

The matching calculating unit 150 performs calculation of the matrix D (Step S223). The calculation of the matrix D performed by the matching calculating unit 150 is in accordance with one of the flow of the processes illustrated in FIGS. 21, 25, and 26.

The matching calculating unit 150 sets the $i^{th}$ row vector of the matrix D to Ei. The matching calculating unit 150 ranks the elements of the Ei vector in the order the value is small and creates the wish list Lvi of the candidate data vi (Step S224).

The matching calculating unit 150 sets the $j^{th}$ column vector of the matrix D to Fj. The matching calculating unit 150 ranks the elements of the Fj vector in the order the value is small and creates the wish list Lsj of the computational resource sj (Step S225).

On the basis of the hospitals/residents problem in which the quota of the hospital is p, the matching calculating unit 150 performs the stable matching (Step S226). At Step S226, the matching calculating unit 150 fixes the hospitals/residents problem to a stable matching problem with an incomplete list and solves the problem by using the extended GS algorithm, thereby the matching calculating unit 150 calculates the stable matching.

For all of the combinations (vi, sj) in the matching M, the matching calculating unit 150 sets the placement destination of the candidate data vi to the computational resource sj (Step S227).

In the following, a description will be given of another process (4) performed by the matching calculating unit 150. The matching calculating unit 150 acquires each of the pieces of the candidate data from the matching management unit 130. As a prerequisite, the pieces of the candidate data are set to v1, v2, . . . , and vN'. The computational resources are set to s1, s2, . . . , and sN. Furthermore, a description will be given with the assumption of ceil (N'/N)=1.

As a prerequisite, the number of pieces of data that have been placed in each of the computational resources 1 to N and the number of pieces of data that have been determined to be placed in each of the computational resources 1 to N are set to n1 to nN. Among the data n1 to nN, the maximum data is set to n* and the minimum data is set to n$_*$. The matching calculating unit 150 calculates the similarities between the candidate data vi and the data placed in the computational resource sj and all of the pieces of the data in which the placement destination of the computational resource sj has been determined. The matching calculating unit 150 represents the maximum value as $d_{ij}$ from among the similarities between the candidate data vi and the data placed in the computational resource sj and all of the pieces of the data in which the placement destination of the computational resource sj has been determined. Furthermore, instead of the maximum value of the similarity, the matching calculating unit 150 may also set the average value of the top k pieces of data to $d_{ij}$. Furthermore, instead of the maximum value of the similarity, the matching calculating unit 150 may also set the value obtained by adding the average m of the similarities to the standard deviation σ to $d_{ij}$.

The matching calculating unit 150 creates an N'×N matrix D in which the elements of (i, j) corresponds to the maximum value $d_{ij}$ of the similarities. The matching calculating unit 150 sorts $i^{th}$ row of the matrix D in ascending order and determines the order of the computational resource sj with respect to the candidate data vi. On the basis of the determined ranking, the matching calculating unit 150 creates the wish list Lvi of the candidate data vi. At this time, there may be a case of $d_{ij}=d_{ij'}$ when j!=j'; however, either one may be first when sorting is performed.

If $d_{ij}$ with respect to the computational resource sj is equal to or greater than the threshold T, the matching calculating unit 150 deletes, from the wish list Lvi of the candidate data vi, the associated computational resource sj.

The matching calculating unit 150 sorts the $j^{th}$ column of the matrix D in ascending order and determines the order of the candidate data vi with respect to the computational resource sj. The matching calculating unit 150 creates the wish list Lsj of the computational resource sj on the basis of the determined order. If $d_{ij}$ associated with the candidate data vi is greater than the threshold T, the matching calculating unit 150 deletes the associated candidate data vi from the wish list Lsj of the computational resource.

If n* is not equal to n$_*$ but nj is equal to n*, the matching calculating unit 150 empties the wish list Lsj of the computational resource sj.

By using the wish lists Lv1, . . . , and LvN' of the pieces of the candidate data and the wish lists Lsj, . . . , and LsN of the computational resources, the matching calculating unit 150 solves the stable matching problem of an incomplete list using the extended GS algorithm.

When the matching calculating unit 150 performs the matching, either one of the candidate data side and the computational resource side may propose. The matching calculating unit 150 notifies the matching management unit 130 of the information on all of the placement destinations of the candidate data paired at the obtained matching. Furthermore, the matching calculating unit 150 sets the placement destination of the unpaired candidate data to undefined and notifies the matching management unit 130 of the status.

Figure 28:
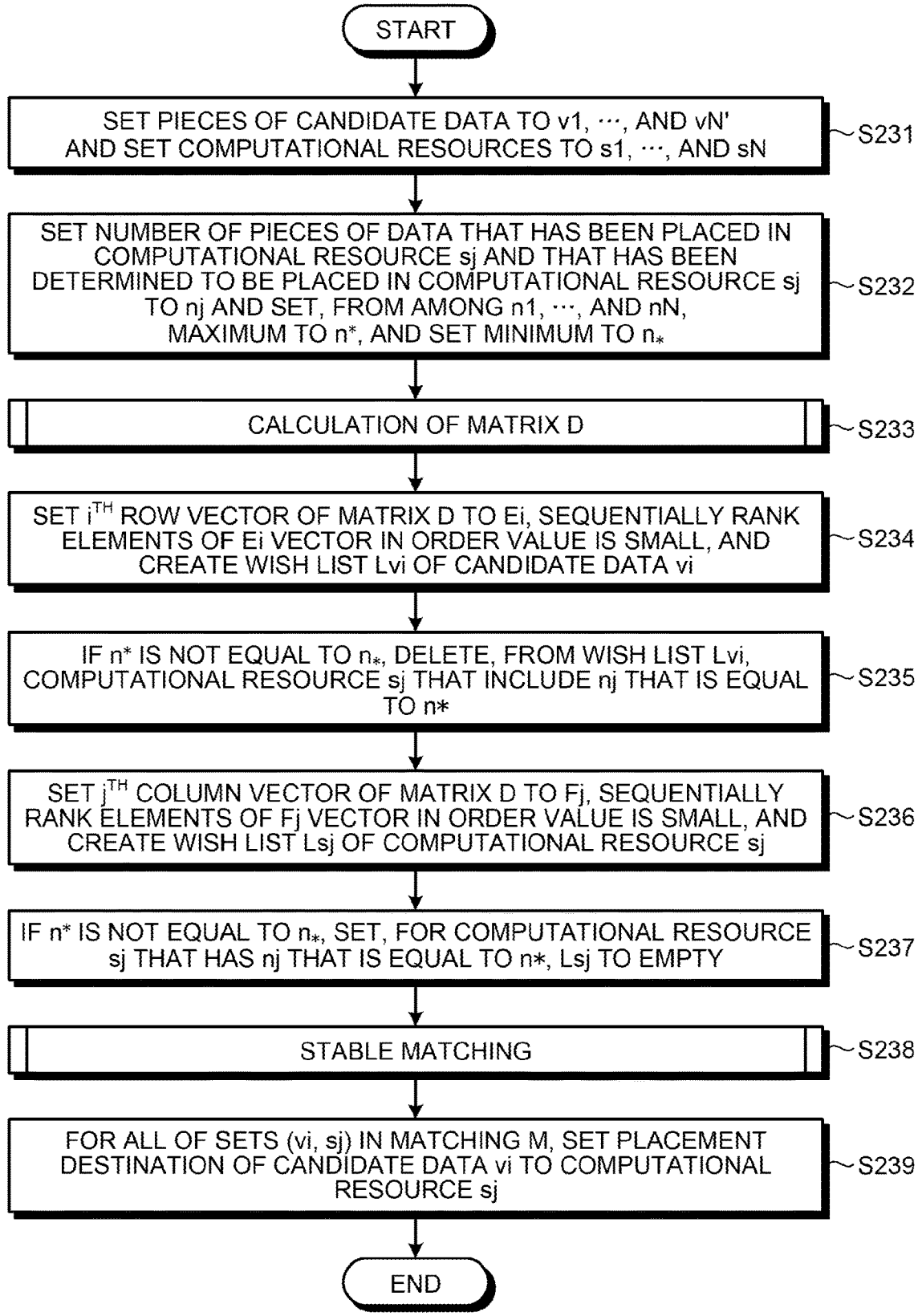
FIG. 28 is a flowchart (3) illustrating the flow of the matching calculating process.

FIG. 28 is a flowchart (3) illustrating the flow of the matching calculating process. As illustrated in FIG. 28, the matching calculating unit 150 sets the pieces of the candidate data to v1, . . . , and vN' and sets the computational resources to s1, . . . , and sN (Step S231). The matching calculating unit 150 sets the number of pieces of the data that has been placed in the computational resource sj and that has been determined to be placed in the computational resource sj to nj and sets, from among the pieces of data n1, . . . , and nN, the maximum data to n*, and sets the minimum data to n$_*$ (Step S232).

The matching calculating unit 150 performs calculation of the matrix D (Step S233). The calculation of the matrix D performed by the matching calculating unit 150 is in accordance with one of the flow of the processes illustrated in FIGS. 21, 25, and 26.

The matching calculating unit 150 sets the $i^{th}$ row vector of the matrix D to Ei. The matching calculating unit 150 ranks the elements of the Ei vector in the order the value is small and creates the wish list Lvi of the candidate data vi (Step S234).

If n* is not equal to n$_*$, the matching calculating unit 150 deletes, from the wish list Lvi, the computational resource sj that includes nj that is equal to n* (Step S235).

The matching calculating unit 150 sets the $j^{th}$ column vector of the matrix D to Fj. The matching calculating unit 150 ranks the elements of the Fj vector in the order the value is small and creates the wish list Lsj of the computational resource sj (Step S236).

If n* is not equal to n*, the matching calculating unit 150 sets, for the computational resource sj that has nj that is equal to n*, Lsj to empty (Step S237).

The matching calculating unit 150 performs the stable matching (Step S238). For all of the combinations (vi, sj) in the matching M, the matching calculating unit 150 sets the placement destination of the candidate data vi to the computational resource sj (Step S239).

In the following, a description will be given of another process (5) performed by the matching calculating unit 150. The matching calculating unit 150 acquires each of the pieces of the candidate data from the matching management unit 130. As a prerequisite, it is assumed that the pieces of candidate data are v1, v2, . . . , and vN'. It is assumed that the computational resources are s1, s2, . . . , and sN. Furthermore, it is assumed that p is an integer specified by p=ceil (N'/N).

As a prerequisite, the number of pieces of data that have been placed in each of the computational resources 1 to N and the number of pieces of data that have been determined to be placed in each of the computational resources 1 to N are set to n1 to nN. From among the pieces of data n1 to nN, the maximum data is set to n* and the minimum data is set to n*. The matching calculating unit 150 calculates the similarities between the candidate data vi and the data placed in the computational resource sj and all of the pieces of the data in which the placement destination of the computational resource sj has been determined. $d_{ij}$ is the maximum value among the similarities between the candidate data vi and the data placed in the computational resource sj and all of the pieces of the data in which the placement destination of the computational resource sj has been determined. Furthermore, instead of the maximum value of the similarity, the matching calculating unit 150 may also set the average value of top k pieces of data to $d_{ij}$. Furthermore, instead of the maximum value of the similarity, the matching calculating unit 150 may also set the value obtained by adding the average m of the similarities to the standard deviation σ to $d_{ij}$.

The matching calculating unit 150 creates the N'×N matrix D in which the elements of (i, j) correspond to the maximum value $d_{ij}$ of the similarity. The matching calculating unit 150 sorts $i^{th}$ row of the matrix D in ascending order and determines the order of the computational resource sj with respect to the candidate data vi. On the basis of the determined order, the matching calculating unit 150 creates the wish list Lvi of the candidate data vi. At this time, there may be a case of $d_{ij}=d_{ij'}$ when j!=j'; however, either one may be first when sorting is performed.

If $d_{ij}$ with respect to the computational resource sj is greater than the threshold T, the matching calculating unit 150 deletes the associated computational resource sj from the wish list Lvi of the candidate data vi.

The matching calculating unit 150 sorts $j^{th}$ column of the matrix D in ascending order and determines the order of the candidate data vi with respect to the computational resource sj. On the basis of the determined order, the matching calculating unit 150 creates the wish list Lsj of the computational resource sj. If $d_{ij}$ associated with the candidate data vi is greater than the threshold T, the matching calculating unit 150 deletes the associated candidate data vi from the wish list Lsj of the computational resource.

If n* is not equal to n* and nj is equal to n*, the matching calculating unit 150 empties the wish list Lsj of the computational resource sj.

By using the wish lists Lv1, . . . , and LvN' of the pieces of the candidate data and by using the wish lists Lsj, . . . , and LsN of the computational resources, the matching calculating unit 150 solves the hospitals/residents problem in which the quota of a hospital is p. The matching calculating unit 150 fixes the hospitals/residents problem to an incomplete list problem and solves the problem by using the extended GS algorithm.

When the matching calculating unit 150 performs the matching, either one of the candidate data side and the computational resource side may propose. The matching calculating unit 150 notifies the matching management unit 130 of the information on all of the placement destinations of the candidate data paired in the obtained matching. Furthermore, the matching calculating unit 150 sets the placement destination of the unpaired candidate data as undefined and notifies the matching management unit 130 of the status.

Figure 29:
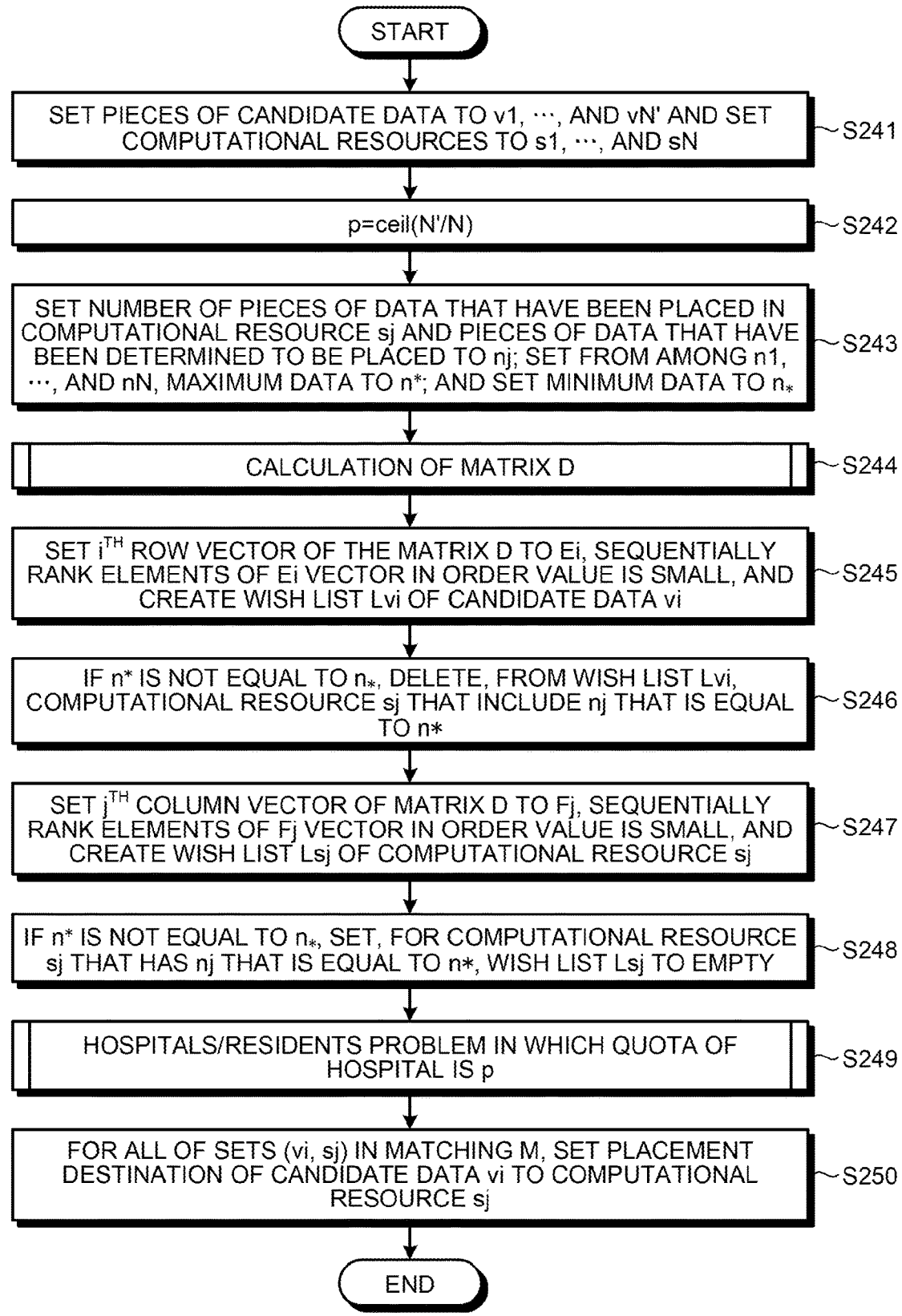
FIG. 29 is a flowchart (4) illustrating the flow of the matching calculating process.

FIG. 29 is a flowchart (4) illustrating the flow of the matching calculating process. As illustrated in FIG. 29, the matching calculating unit 150 sets the pieces of the candidate data to v1, . . . , and vN' and sets the computational resources to s1, . . . , and sN (Step S241). The matching calculating unit 150 calculates p=ceil (N'/N) (Step S242).

The matching calculating unit 150 sets the number of pieces of data that have been placed in the computational resource sj and pieces of data that have been determined to be placed in the computational resource sj to nj; sets, from among the pieces of data n1, . . . , and nN, the maximum data to n*; and sets the minimum data to n* (Step S243).

The matching calculating unit 150 performs calculation of the matrix D (Step S244). The calculation of the matrix D performed by the matching calculating unit 150 is in accordance with one of the flow of the processes illustrated in FIGS. 21, 25, and 26.

The matching calculating unit 150 sets the $i^{th}$ row vector of the matrix D to Ei. The matching calculating unit 150 sequentially ranks the elements of the Ei vector in the order the value is small and creates the wish list Lvi of the candidate data vi (Step S245).

If n* is not equal to n*, the matching calculating unit 150 deletes, from the wish list Lvi, the computational resource sj that includes nj that is equal to n* (Step S246).

The matching calculating unit 150 sets the $j^{th}$ column vector of the matrix D to Fj. The matching calculating unit 150 ranks the elements of the Fj vector in the order the value is small and creates the wish list Lsj of the computational resource sj (Step S247).

If n* is not equal to n*, the matching calculating unit 150 sets, for the computational resource sj that has nj that is equal to n*, the wish list Lsj to empty (Step S248).

The matching calculating unit 150 solves the hospitals/residents problem in which the quota of a hospital is p (Step S249). For all of the combinations of (vi, sj) in the matching M, the matching calculating unit 150 sets the placement destination of the candidate data vi to the computational resource sj (Step S250).

Figure 30:
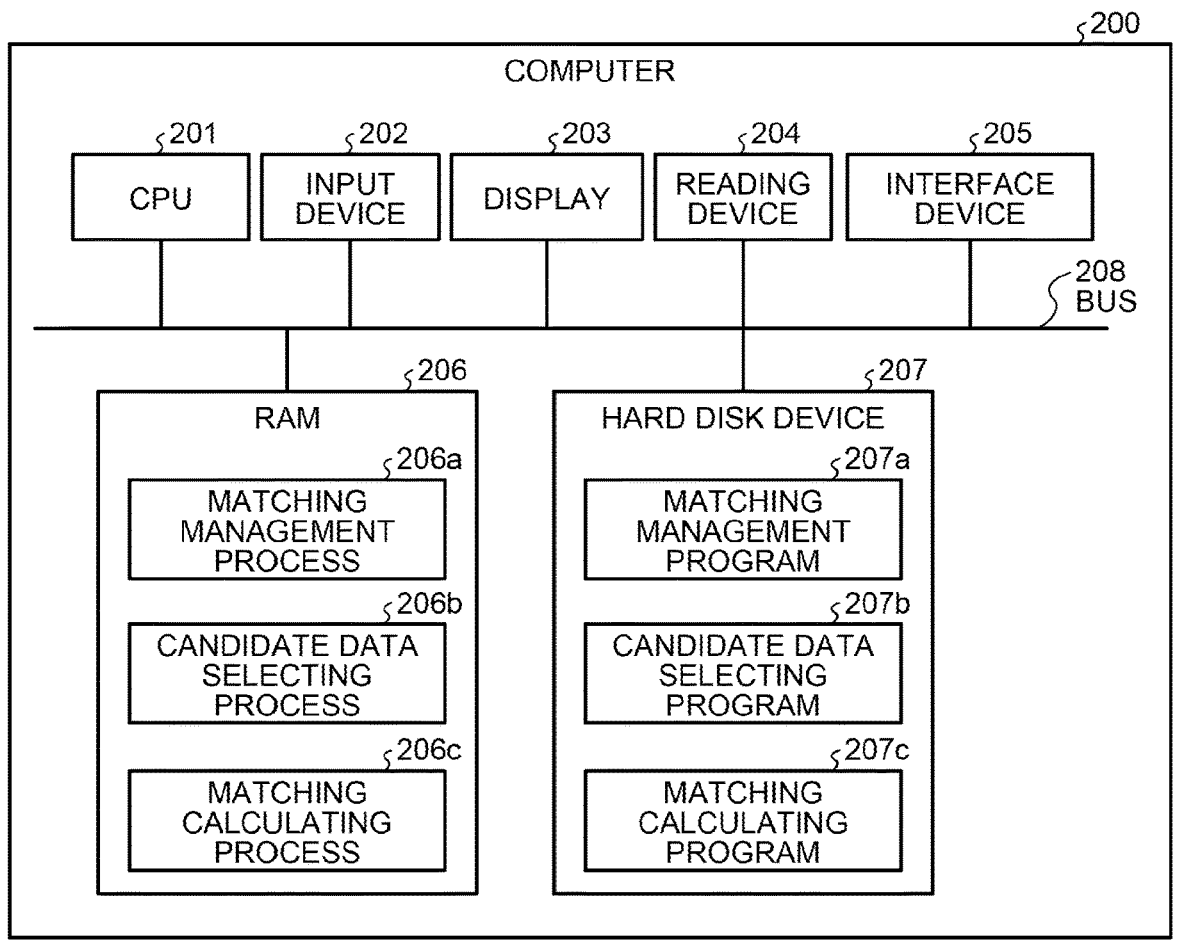
FIG. 30 is a block diagram illustrating an example of a computer that executes a data placement program.
Figure 31:
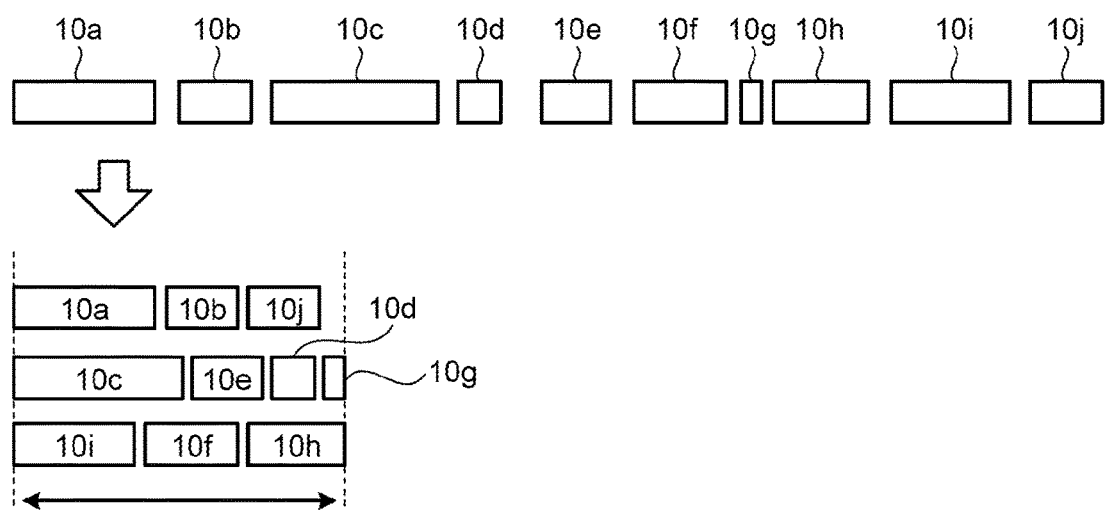
FIG. 31 is a schematic diagram illustrating an example of a conventional technology.

In the following, a description will be given of an example of a computer that executes a data placement program that implements the same function as that performed by the data placement device 100 in the embodiment described above. FIG. 30 is a block diagram illustrating an example of a computer that executes a data placement program.

As illustrated in FIG. 30, a computer 200 includes a CPU 201 that executes various kinds of arithmetic processing, an input device 202 that receives an input of data from a user, and a display 203. Furthermore, the computer 200 includes a reading device 204 that reads a program or the like from a storage medium and an interface device 205 that sends and receives data to and from another computer via a network. Furthermore, the computer 200 includes a RAM 206 that temporarily stores therein various kinds of information and a hard disk device 207. Then, each of the devices 201 to 207 are connected to a bus 208.

The hard disk device 207 includes a matching management program 207a, a candidate data selecting program 207b, and a matching calculating program 207c. The CPU 201 reads the matching management program 207a, the candidate data selecting program 207b, and the matching calculating program 207c and loads the programs in the RAM 206. The matching management program 207a functions as a matching management process 206a. The candidate data selecting program 207b functions as a candidate data selecting process 206b. The matching calculating program 207c functions as a matching calculating process 206c. For example, the process of the matching management process 206a corresponds to the process performed by the matching management unit 130. The process of the candidate data selecting process 206b corresponds to the process performed by the candidate data selecting unit 140. The process of the matching calculating process 206c corresponds to the process performed by the matching calculating unit 150.

Furthermore, the matching management program 207a, the candidate data selecting program 207b, and the matching calculating program 207c do not need to be stored in the hard disk device 207 from the beginning. For example, each of the programs is stored in a "portable physical medium", such as a flexible disk (FD), a CD-ROM, a DVD disk, a magneto-optic disk, an IC CARD, or the like that is to be inserted into the computer 200. Then, the computer 200 may read and execute each of the programs 207a to 207c from the portable physical medium.

According to an aspect of an embodiment of the present invention, an advantage is provided in that, when pieces of data are placed in a plurality of the computational resources, it is possible to prevent an increase in similarities of data placed in the same computational resource while substantially equalizing the amount of data to be allocated to each of the computational resources.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a data placement program that causes a computer to execute a process comprising:
   acquiring first pieces of data from input data that also includes second pieces of data, a number of the first pieces of data corresponding to a number of computational resources, and placing the acquired first pieces of data respectively to the computational resources;
   creating, for each of the second pieces of data, a number thereof corresponding to the number of the computational resources, a first similarity index that indicates an order of the computational resources, and, for each of the computational resources, a second similarity index that indicates an order of the second pieces of data, based on a similarity between each of the second pieces of data and each of the first pieces of data that are respectively placed in the computational resources, wherein the smaller the order is, the smaller the similarity is;
   allocating a piece of data among the second pieces of data to a computational resource among the computational resources by using a matching system in which an allocation by the allocating becomes stable in a direction in which an order of the computational resource indicated in the first similarity index and an order of the piece of data indicated in the second similarity index become small, the second pieces of data each being allocated to different computation resources, wherein the allocating includes specifying a first computational resource to which a priority is given for a first piece of data on a basis of the first similarity index and allocating the first piece of data to the first computational resource, in place of a second piece of data that has already been allocated to the first computational resource, when an order indicated in the second similarity index with respect to the first piece of data is smaller than an order indicated in the second similarity index with respect to the second piece of data; and
   placing the allocated second pieces of data respectively to the computational resources according to the allocating, wherein the computer executes a check process of a piece of query data that is acquired from an input unit against the input data placed to the computational resources by having the computational resources execute the check process in a distributed manner.

2. The non-transitory computer-readable recording medium according to claim 1, the process further comprising:
   specifying a number that is minimum among numbers of pieces of data that are respectively placed in the computational resources;
   leaving the specified number of pieces of data in each of the computational resources; and
   setting a placement destination of pieces of data that are not left in each of the computational resources as undefined.

3. The non-transitory computer-readable recording medium according to claim 1, wherein the acquiring includes classifying the input data into a plurality of clusters, selecting a cluster from the classified clusters, and acquiring pieces of data by a number that corresponds to the number the computational resources from pieces of data belonging to the selected cluster.

4. A data placement method comprising:
   acquiring, performed by a computer, first pieces of data from input data that also includes second pieces of data, a number of the first pieces of data corresponding to a number of computational resources, and placing the acquired first pieces of data respectively to the computational resources;
   creating, performed by the computer, for each of the second pieces of data, a number thereof corresponding to the number of the computational resources, a first similarity index that indicates an order of the computational resources, and, for each of the computational resources, a second similarity index that indicates an order of the second pieces of data, based on a similarity between each of the second pieces of data and each of the first pieces of data that are respectively placed in the computational resources, wherein the smaller the order is, the smaller the similarity is;

allocating, performed by the computer, a piece of data among the second pieces of data to a computational resource among the computational resources by using a matching system in which an allocation by the allocating becomes stable in a direction in which an order of the computational resource indicated in the first similarity index and an order of the piece of data indicated in the second similarity index become small, the second pieces of data each being allocated to different computation resources, wherein the allocating includes specifying a first computational resource to which a priority is given for a first piece of data on a basis of the first similarity index and allocating the first piece of data to the first computational resource, in place of a second piece of data that has already been allocated to the first computational resource, when an order indicated in the second similarity index with respect to the first piece of data is smaller than an order indicated in the second similarity index with respect to the second piece of data; and placing, performed by the computer, the allocated second pieces of data respectively to the computational resources according to the allocating, wherein the computer executes a check process of a piece of query data that is acquired from an input unit against the input data placed to the computational resources by having the computational resources execute the check process in a distributed manner.

5. The data placement method according to claim 4 further comprising:
specifying a number that is minimum among numbers of pieces of data that are respectively placed in the computational resources;
leaving the specified number of pieces of data in each of the computational resources; and
setting a placement destination of pieces of data that are not left in each of the computational resources as undefined.

6. The data placement method according to claim 4 wherein the acquiring includes classifying the input data into a plurality of clusters, selecting a cluster from the classified clusters, and acquiring pieces of data by a number that corresponds to the number of the computational resources from pieces of data belonging to the selected cluster.

7. A data placement device comprising:
a processor that executes a process comprising:
acquiring first pieces of data from input data that also includes second pieces of data, a number of the first pieces of data corresponding to a number of computational resources, and placing the acquired first pieces of data respectively to the computational resources;

creating, for each of the second pieces of data, a number thereof corresponding to the number of the computational resources, a first similarity index that indicates an order of the computational resources, and, for each of the computational resources, a second similarity index that indicates an order of the second pieces of data, based on a similarity between each of the second pieces of data and each of the first pieces of data that are respectively placed in the computational resources, wherein the smaller the order is, the smaller the similarity is;

allocating a piece of data among the second pieces of data to a computational resource among the computational resources by using a matching system in which an allocation by the allocating becomes stable in a direction in which an order of the computational resource indicated in the first similarity index and an order of the piece of data indicated in the second similarity index become small, the second pieces of data each being allocated to different computation resources, wherein the allocating includes specifying a first computational resource to which a priority is given for a first piece of data on a basis of the first similarity index and allocating the first piece of data to the first computational resource, in place of a second piece of data that has already been allocated to the first computational resource, when an order indicated in the second similarity index with respect to the first piece of data is smaller than an order indicated in the second similarity index with respect to the second piece of data; and placing the allocated second pieces of data respectively to the computational resources according to the allocating, wherein the computer executes a check process of a piece of query data that is acquired from an input unit against the input data placed to the computational resources by having the computational resources execute the check process in a distributed manner.

8. The data placement device according to claim 7, the process further comprising
specifying a number that is minimum among numbers of pieces of data that are respectively placed in the computational resources;
leaving the specified number of pieces of data in each of the computational resources; and
setting a placement destination of pieces of data that are not left in each of the computational resources as undefined.

9. The data placement device according to claim 7, wherein the acquiring includes classifying the input data into a plurality of clusters, selecting a cluster from the classified clusters, and acquiring pieces of data by a number that corresponds to the number of the computational resources from pieces of data belonging to the selected cluster.

* * * * *